United States Patent
Singh et al.

(10) Patent No.: US 8,661,885 B1
(45) Date of Patent: Mar. 4, 2014

(54) TIRE SIDEWALL LOAD ESTIMATION SYSTEM AND METHOD

(75) Inventors: Kanwar Bharat Singh, Stow, OH (US); John Michael Fenkanyn, Akron, OH (US); Amrita Patel, Copley, OH (US); Peter Jung-min Suh, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 11 days.

(21) Appl. No.: 13/609,695

(22) Filed: Sep. 11, 2012

(51) Int. Cl.
*G01M 17/02* (2006.01)
*B60C 23/00* (2006.01)
*G06F 17/00* (2006.01)

(52) U.S. Cl.
USPC .................................. 73/146; 701/1; 701/70

(58) Field of Classification Search
USPC ................................................ 73/146–146.8
See application file for complete search history.

(56) References Cited

U.S. PATENT DOCUMENTS

| 7,945,361 | B2 * | 5/2011 | Brusarosco et al. | 701/36 |
| 2003/0046992 | A1 * | 3/2003 | Caretta | 73/146 |
| 2003/0144767 | A1 * | 7/2003 | Brachert et al. | 701/1 |
| 2007/0010928 | A1 * | 1/2007 | Brusarosco et al. | 701/70 |
| 2007/0240501 | A1 * | 10/2007 | Mancosu et al. | 73/146 |
| 2007/0240502 | A1 * | 10/2007 | Morinaga et al. | 73/146 |
| 2011/0199201 | A1 | 8/2011 | Brusarosco et al. | 340/438 |
| 2011/0231113 | A1 * | 9/2011 | Brusarosco et al. | 702/41 |

* cited by examiner

*Primary Examiner* — Andre Allen
(74) *Attorney, Agent, or Firm* — Richard B. O'Planick

(57) ABSTRACT

A system and method of estimating a load bearing on a vehicle tire includes an inflation pressure measuring sensor attached to the tire for measuring a tire cavity inflation pressure level; and one or more piezofilm deformation measuring sensors mounted to one or both of the tire sidewalls. The deformation measuring sensor generates within the tire footprint a deformation signal having signal power level indicative of a level of sidewall deformation within the footprint contact patch. Power-to-load maps adjusted for tire inflation pressure are generated and stored for the tire, the maps correlating a range of load levels to a range of signal power levels whereby operatively enabling a load level to be identified for each signal power level on an inflation pressure adjusted basis.

14 Claims, 25 Drawing Sheets

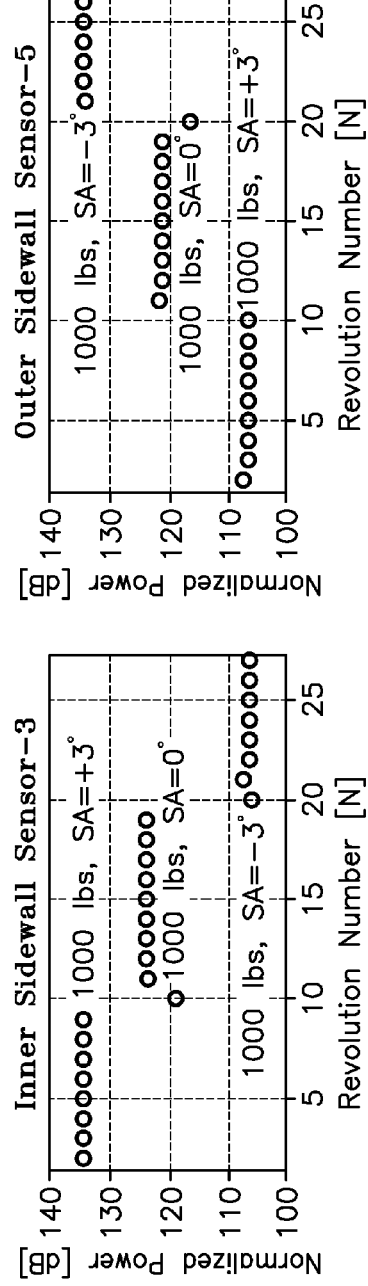
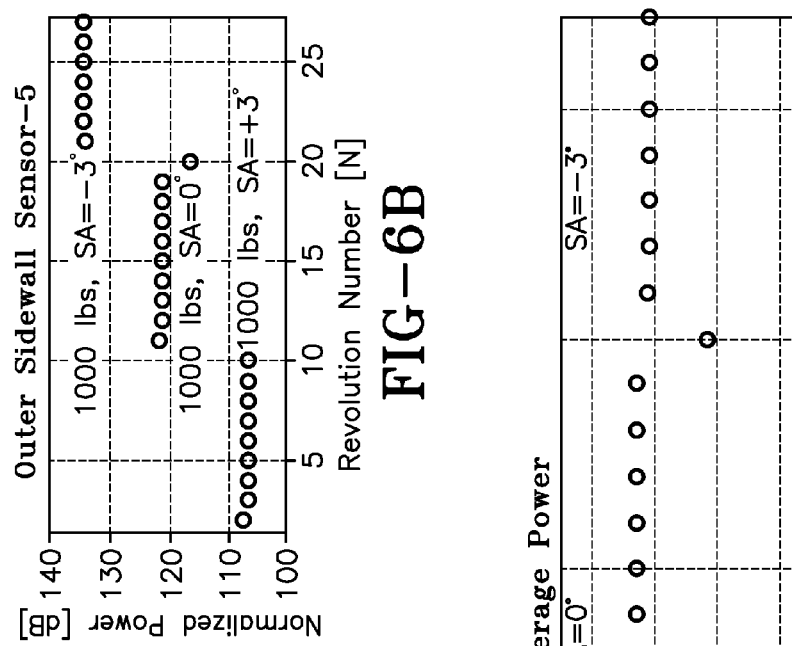
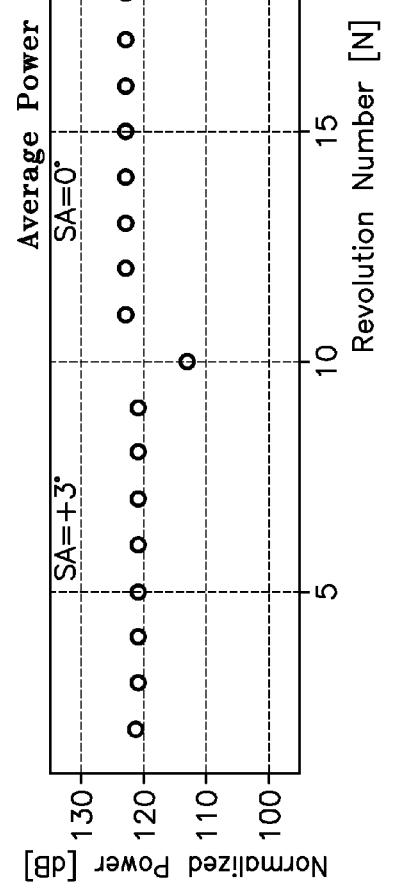
FIG-6A
FIG-6B
FIG-6C

TIRE SIDEWALL LOAD ESTIMATION SYSTEM AND METHOD

FIELD OF THE INVENTION

The invention relates generally to tire monitoring systems for collecting measured tire parameter data during vehicle operation and, more particularly, to systems for estimating vehicle tire loading through a tire sidewall based upon such measurements.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as tire loading are important considerations for vehicle operation and safety. It is accordingly further desirable to measure tire loading and communicate load information to a vehicle operator in conjunction with the measured tire parameters of pressure and temperature.

SUMMARY OF THE INVENTION

In one aspect of the invention, a system and method of estimating a load bearing on a vehicle tire is provided. The system includes an inflation pressure measuring sensor attached to the tire for measuring a tire cavity inflation pressure level; and one or more piezofilm deformation measuring sensors mounted to a tire sidewall. The deformation measuring sensor generates within the tire footprint a deformation signal having signal power level indicative of a level of sidewall deformation within the footprint contact patch. Power-to-load maps adjusted for tire inflation pressure are generated and stored for the tire, the maps correlating a range of load levels to a range of signal power levels whereby operatively enabling a load level to be identified for each signal power level on an inflation pressure adjusted basis.

In another aspect of the invention, a deformation measuring sensor is mounted to each of the sidewalls and an average of the signal power level from each sensor is used in referencing the power-to-load maps in order to identify a corresponding load level on a tire inflation pressure adjusted basis.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 6A is a graph of Normalized Power vs. Revolution Number [N] for an inner sidewall sensor-3 for the three slip angles at a tire load of 1000 pounds.

FIG. 6B is a graph of Normalized Power vs. Revolution Number [N] for an outer sidewall sensor-5 for the three slip angles at a tire load of 1000 pounds.

FIG. 6C is a graph of Average Power showing Normalized Power [dB] vs. Revolution Number [N].

DETAILED DESCRIPTION OF THE INVENTION

Figure 1:
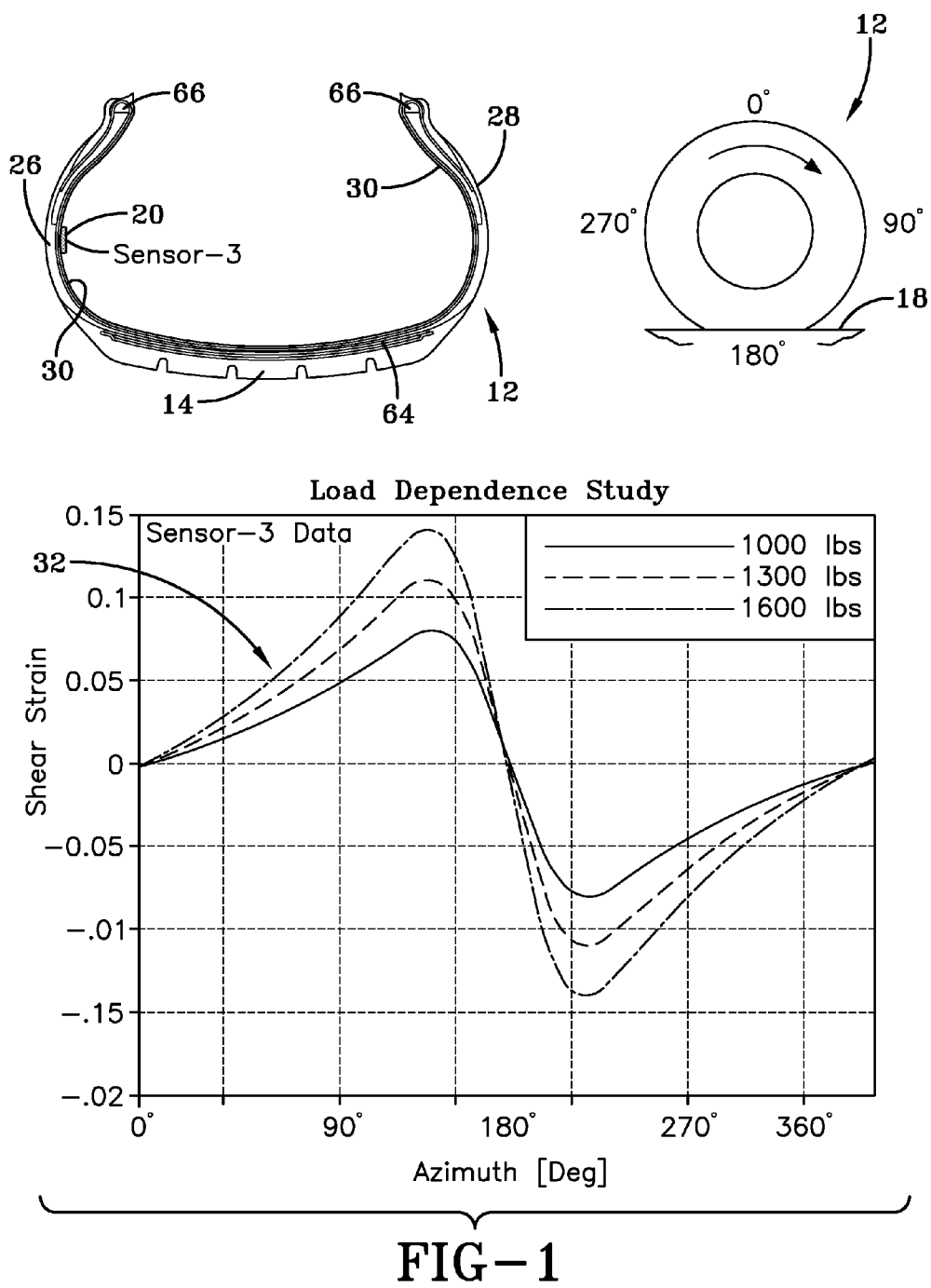
FIG. 1 is a diagrammatic view of a tire in cross-section, a rolling tire showing azimuth degree designations; and a graph of load dependence in which shear strain in the tire is graphed against azimuth for three different tire loads.
Figure 5:
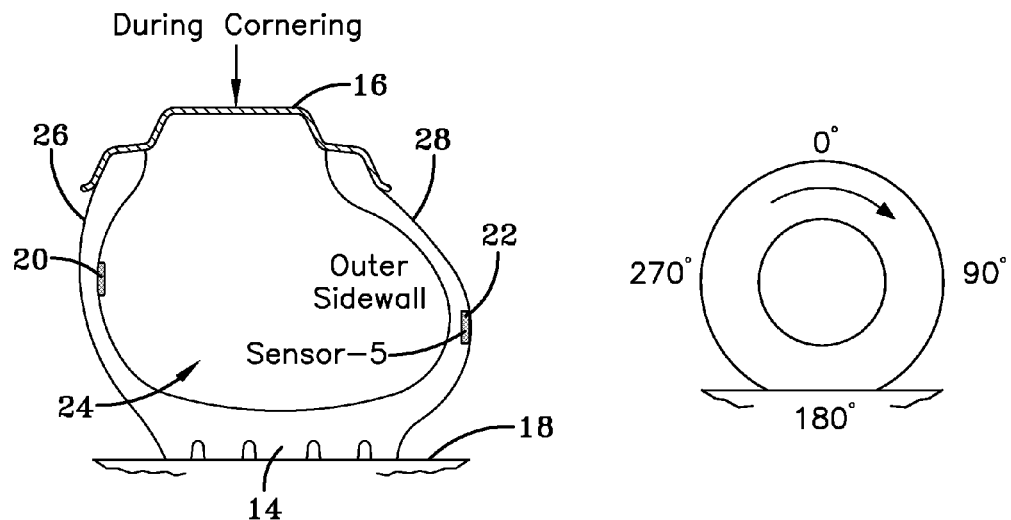
FIG. 5 is a diagrammatic representation of a tire in cross-section during cornering, a rolling tire showing azimuth degree designations; and a slip angle dependence study graph of shear strain vs. azimuth (Deg) for three slip angle data lines at a tire load of 1000 pounds.
Figure 5:
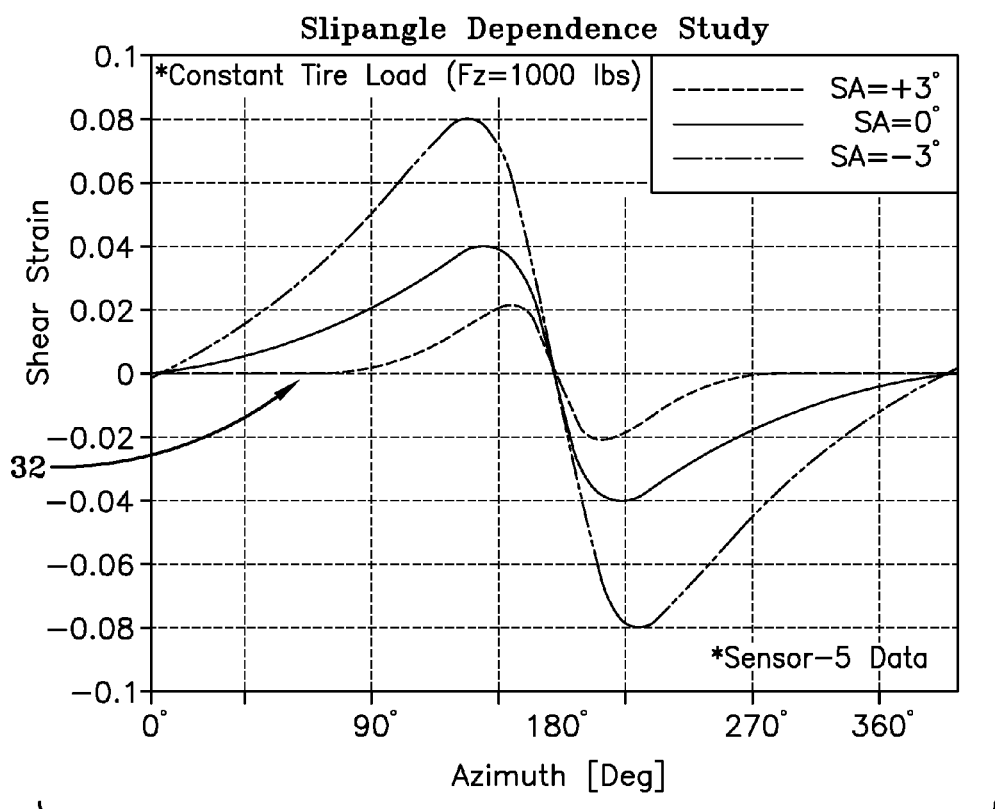
Figure 15:
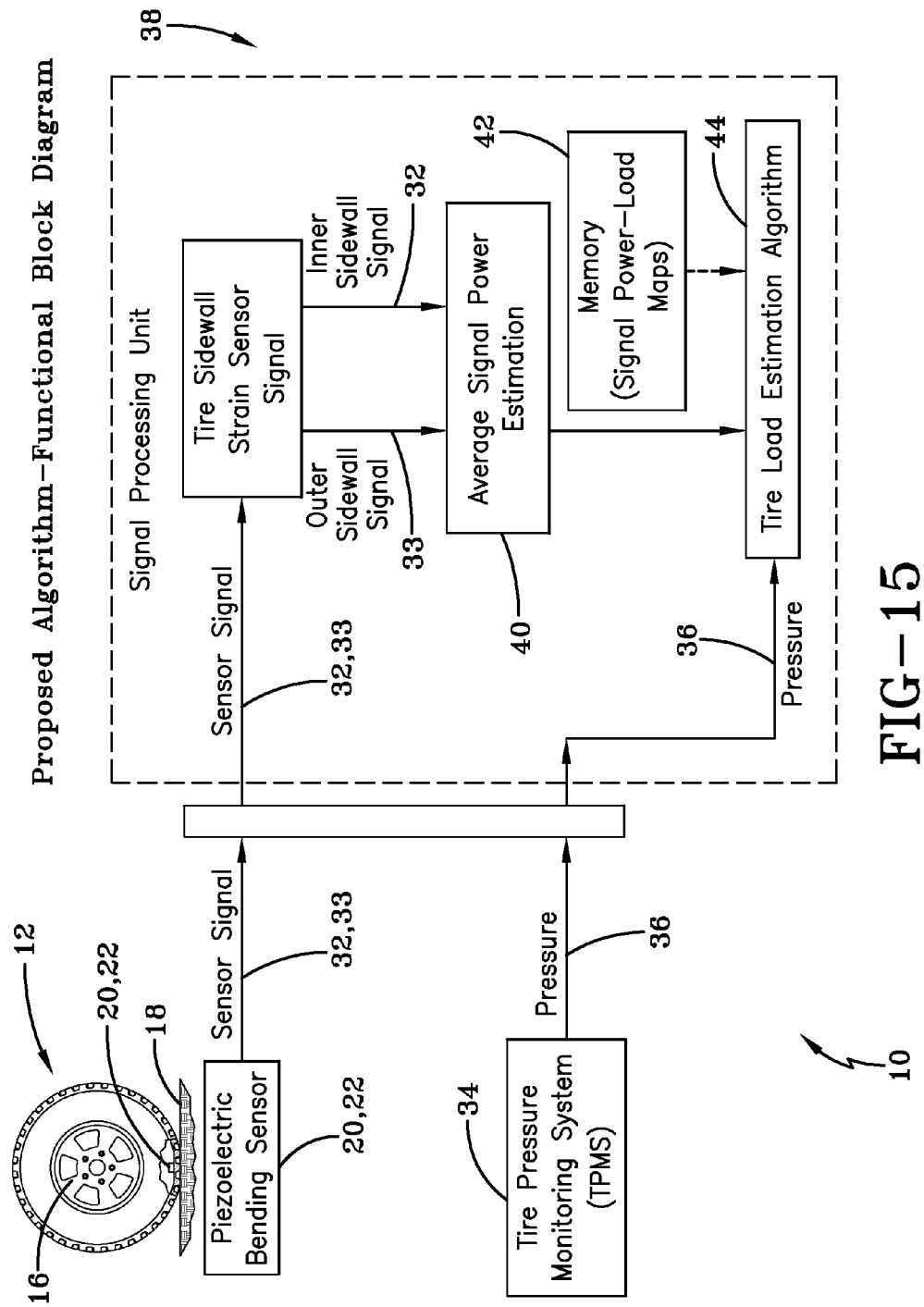
FIG. 15 is a functional block diagram of the Algorithm employed by the system.

Referring to FIGS. 1, 5, 15, a system 10 for estimating tire load from tire deflection measurement and tire pressure is shown in diagrammatic form. The system 10 is incorporated into a tire 12 of conventional construction, having a tread component 14 at a tire crown region which contacts a ground surface 18 during rolling operation. The tire 12 mounts to a rim 16 in conventional manner. At least one tire deformation measuring sensor 20 mounts to an inner sidewall 26. Other sensors, including a like-configured tire deformation measuring sensor 22 may be mount to an outward sidewall 28. The sensors 20, 22 may be affixed by adhesive to an innerliner 30 defining a tire cavity 24. The sensors 20, 22 are preferably piezoelectric bending sensors, or other suitable strain sensors commercially available, of a type operational to bend and reconfigure when subjected to a bending force and each generate an electrical signal 32, 33 respectively, indicative of the magnitude of bending reconfiguration in the sensor body. The bending signals 32, 33 are thus indicative of the magnitude of the bending strain within the sidewall to which the sensor is attached. When the bending force is removed, the sensor resumes its original configuration. For the tire application shown, a piezoelectric bending sensor such as bending film sensor commercially offered by Measurement Specialties, Inc. located at 1000 Lucas Way, Hampton, Va. 23666 may be employed. The piezoelectric sensor functionally mounts flush to a surface and a piezoresistive film sensor body, when subjected to a bending force, bends and generates a signal proportional to the magnitude of bending force on the body.

With the sensor signal(s) 32, 33 is a measurement of tire inflation pressure by a tire pressure monitoring system (TPMS) mounted to the tire, of a type commercially available. The TPMS system includes a pressure sensor that mounts to a tire in communication with an internal tire air cavity and functions to measure the air pressure within the tire cavity and transmit the measured pressure data to a receiver. The measurement of the TPMS may further include a temperature sensor that measures tire temperature. Measured pressure value 36 of the tire cavity 24 is transmitted by the TPMS system to a data processor for recordation and analysis. Should the pressure falls below a minimum threshold, a warning will be generated to the vehicle operator.

The system and apparatus 10 feeds the tire deformation sensor signal(s) 32, 33 to a signal processing unit 38 for processing in order to ascertain from the signal an average signal power estimation 40. The sensors 20, 22, respectively mounted to the inner and outer sidewalls, 26, 28, provide an inner sidewall signal 32 and an outer sidewall signal 33 which is used in the estimation of average signal power 40. From stored memory files, and signal power load maps stored in such memory 42, an estimated tire loading is derived using a tire load estimation algorithm 44. Should the estimated loading exceed a recommended level, a warning signal may be generated and communicated back to the operator of the vehicle.

Figure 14:
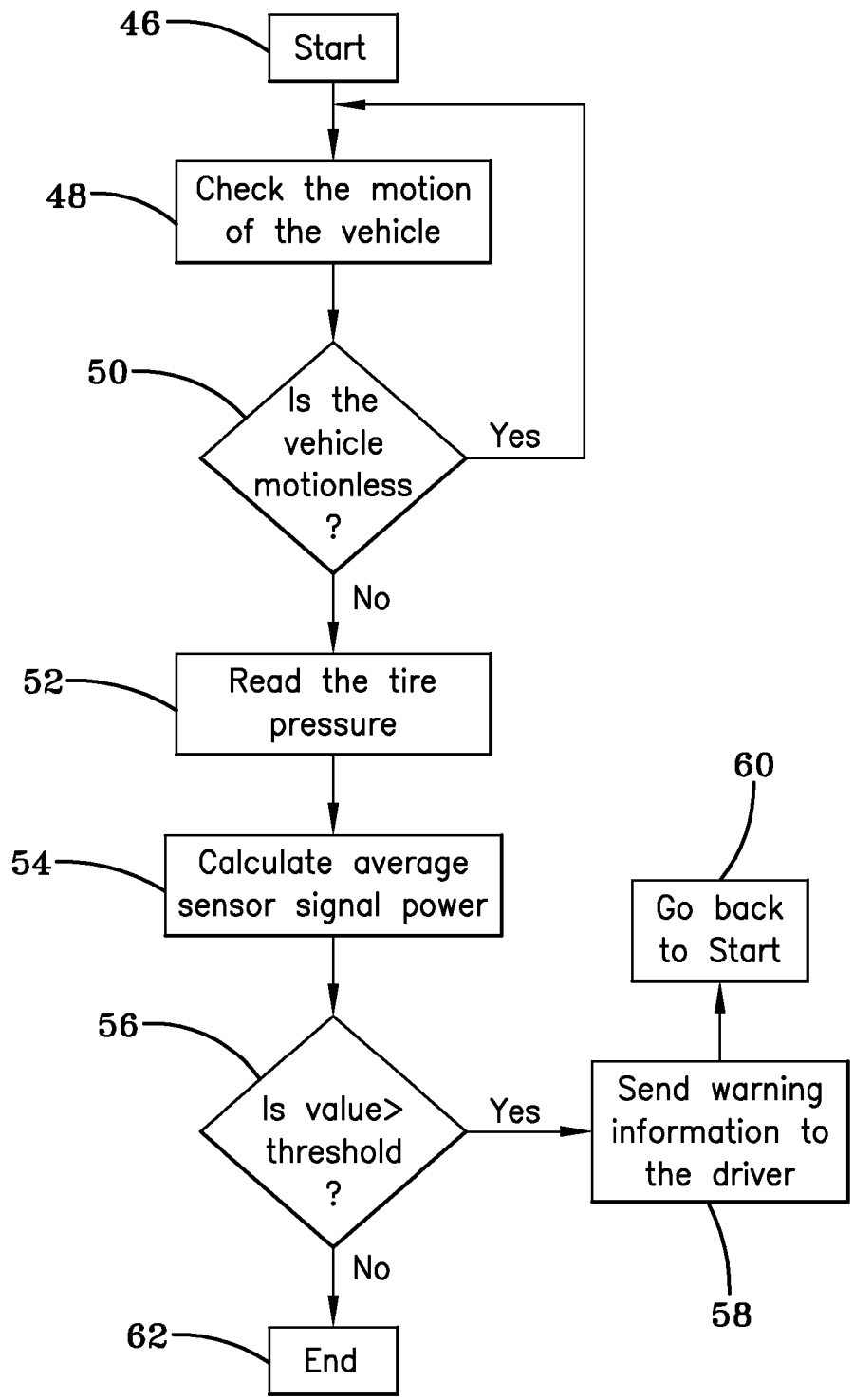
FIG. 14 is a flow diagram of the system operation for determining an overload condition in a vehicle.

FIG. 14 represents in block diagram form the sequence of system operation. At the start 46, the vehicle is checked 48, and motion detected 50. The tire pressure is read 52, and the average sensor signal power is calculated 54. If the value of the estimated load based upon the average sensor signal power exceeds a threshold 56, a warning 58 is sent and the system recycles 60 and concludes 62 when the estimated load is below the threshold value.

Figure 2:
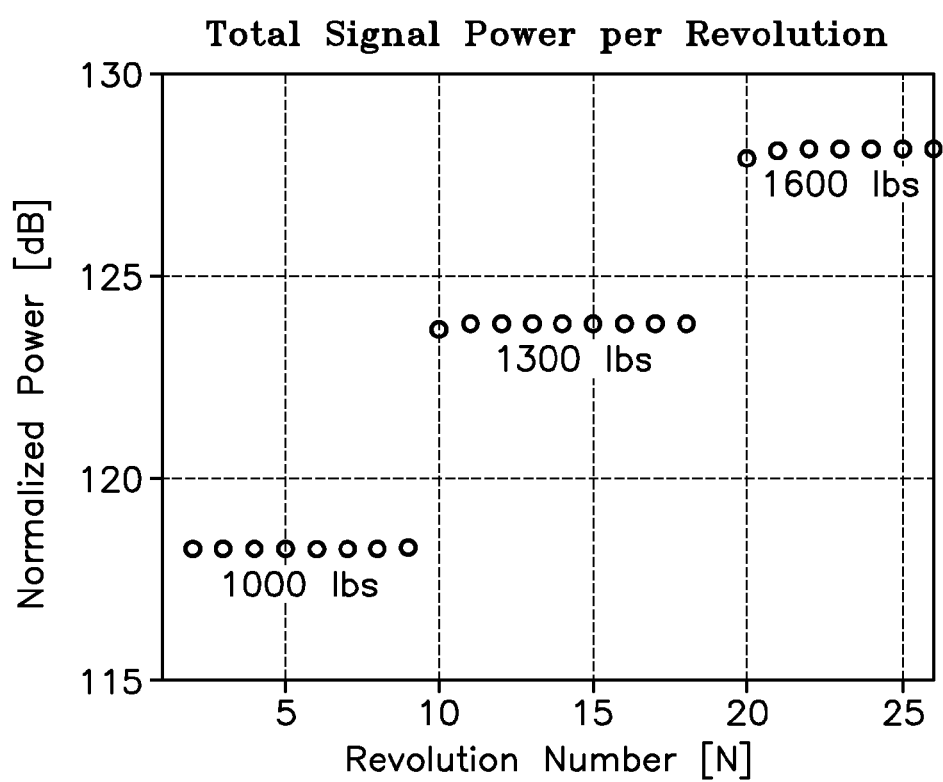
FIG. 2 is a total signal power per revolution graph from the piezoelectric sensor bending with the tire sidewall, showing normalized power (db) against Revolution Number (N) for the three representative load level cases selected for illustration.

With reference to FIGS. 1 and 2, the tire 12 is adapted to include the inner sensor 20 mounted to an inward sidewall 28. The tire belt(s) 64, located beneath the tread 14, is connected to the beads 66 of the tire through the sidewalls 26, 28. An increase in the applied vertical load on the tire leads to vertical displacement of the wheel with respect to the tire belt. The sidewalls then shear the beads in the opposite direction at the entry and exit of the contact area. FIG. 1 shows a graph illustrating the effect of the vertical component on the strain on the sidewall in straight line driving for three load levels: 1000, 1300, and 1600 pounds. The signal 32 generated by the sensor 20 demonstrates the magnitude of shear strain which the sidewall experiences for the three load levels.

Figure 3:
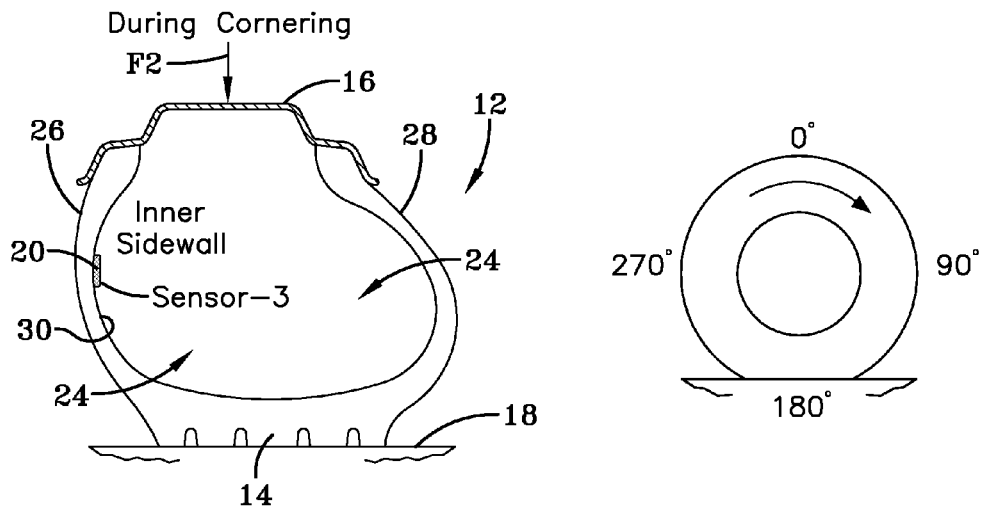
FIG. 3 is a diagrammatic representation of a tire in cross-section, a rolling tire showing azimuth degree designations; and a slip angle dependence study graph of shear strain vs. azimuth (Deg) for three slip angle data lines at a tire load of 1000 pounds.
Figure 3:
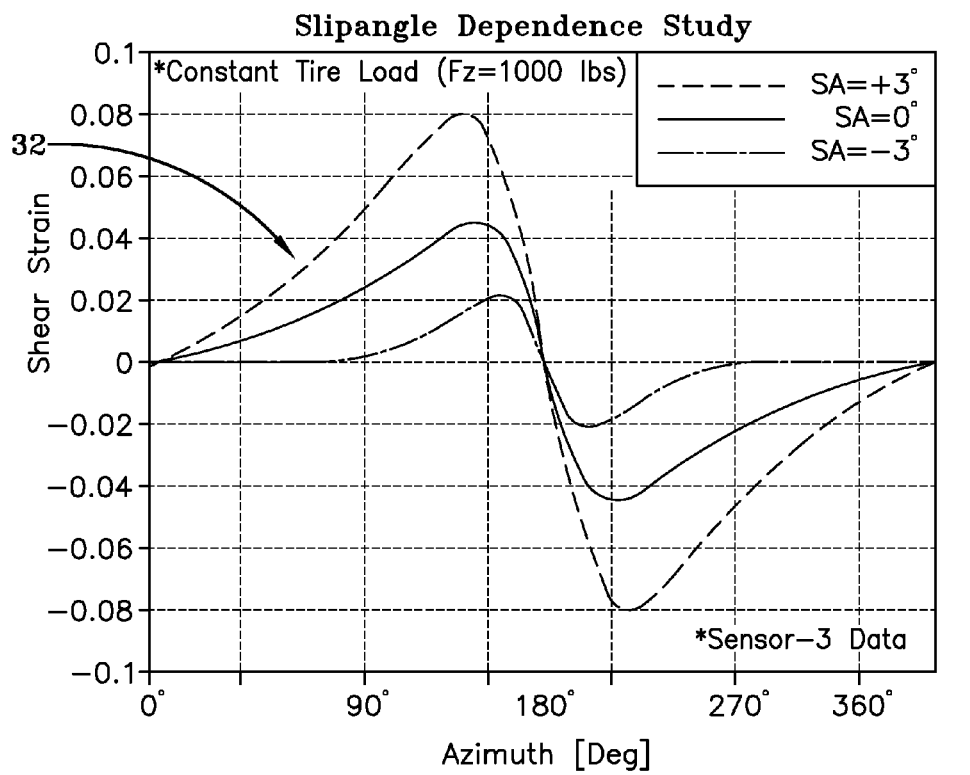
Figure 4:
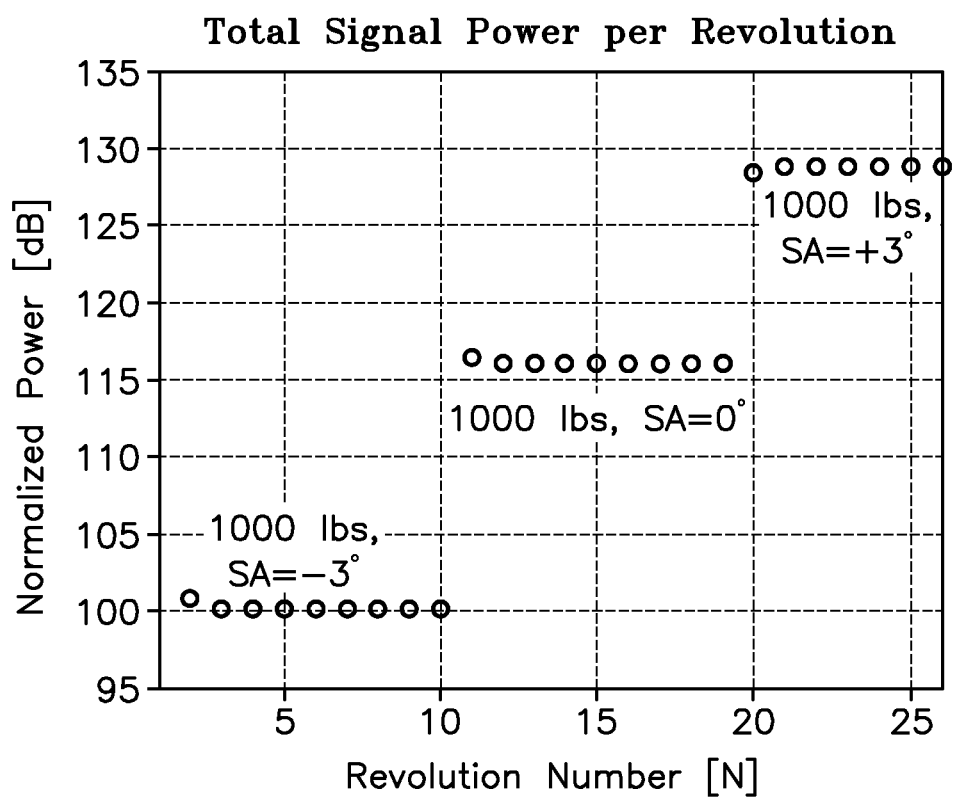
FIG. 4 is a total signal power per revolution graph from the piezoelectric sensor bending with the tire sidewall, showing Normalized Power (db) graphed against Revolution Number (N) for the three representative slip angles selected for illustration at 1000 pounds of load.

As seen in FIG. 2, the total signal power per revolution is shown by the data points for the three load levels examined. A strong correlation between the shear strain amplitude on the tire sidewall and the load on the tire is demonstrated. The straight line driving condition reflected in the data and graphs of FIGS. 1 and 2 is modified in FIGS. 3 and 4 to examine the effects due to lateral sidewall deflection during cornering of the vehicle. As seen in FIG. 3, during cornering, a substantial difference in the sidewall strain levels under constant loading conditions is present. Comparison of the graphs of FIGS. 1 and 3 reveal the strain level differential detected between straight and cornering driving conditions. In FIG. 3, results of a slip angle dependence study are shown in graphical form for three slip angle conditions, +/−3 degrees and zero at a constant tire load of 1000 pounds. The graph of shear strain vs. azimuth (deg.) shows the effect of a change in slip angle on the measured strain. This variation must be accounted for in utilizing signal power during a cornering maneuver as will be appreciated from the data point presentation of FIG. 4 for the exemplary three slip angle settings utilized. FIG. 4 shows normalized power [dB] vs. revolution number [N] at constant loading of 1000 pounds.

In FIG. 5, the graph and diagram is shown for a sensor 22 mounted to the outside tire sidewall 28 during cornering. The inside and the outside sidewalls may thus be monitored for strain simultaneously. The slip angle dependence study graph 32 of FIG. 5 shows shear strain vs. azimuth [Deg.] at constant load (1000 pounds) for the three slip angles used. The inner sidewall graph of FIG. 3 may be compared with the outer sidewall graph of FIG. 5 to understand the effect of slip angle on the shear strain signal on both sides of the tire during cornering. For comparison purposes, the data points for normalized power vs. revolution number [N] for the inner sidewall sensor and the outer sidewall sensor are shown side by side in FIGS. 6A and 6B, respectively. The average power is further shown in FIG. 6C as normalized power [dB] vs. Revolution Number [N]. It will be appreciated that, for the three slip angle conditions, the normalized power is approximately constant and equal.

Figure 7:
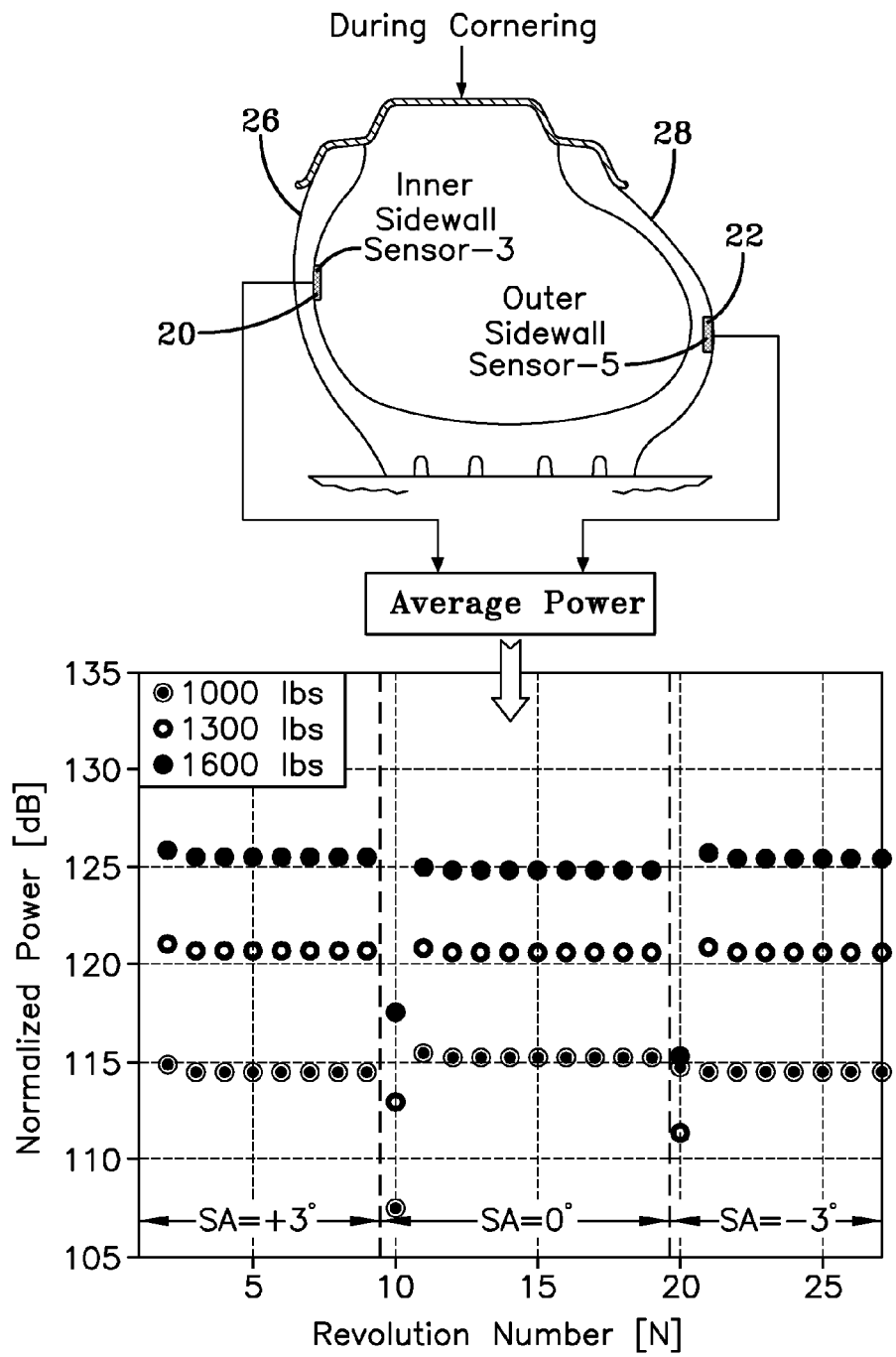
FIG. 7 is a diagrammatic representation of a cornering tire with inner sidewall sensor-3 and outer sidewall sensor-5 in position and a chart of Average Power showing Normalized Power [dB] vs. Revolution Number [N] for three different load levels.

FIG. 7 shows the data points for average power for the three slip angle conditions resulting from averaging the power from the inner sidewall sensor 20 and the outer sidewall sensor 22 during cornering. In the data point comparison graph of FIG. 7, three load levels are shown and the normalized power [dB] for each level at the three slip angle settings are shown. The normalized power for each load is a constant for each slip angle but the constant varies depending on tire loading. The normalized power constant thus may be used as indicative of the loading level on the tire pursuant to the subject invention.

Figure 8A:
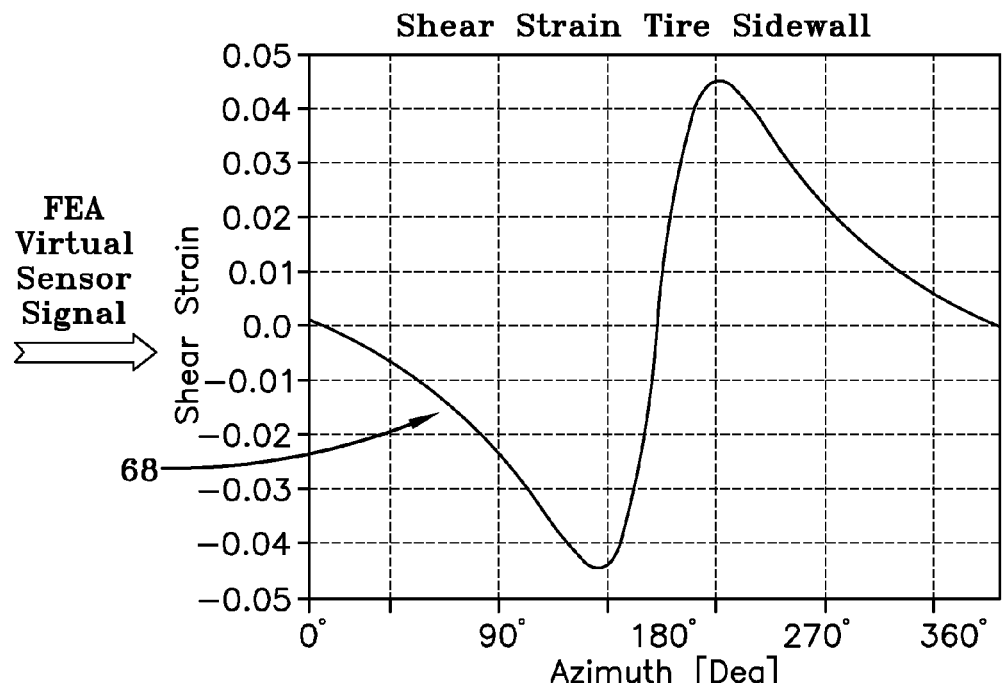
FIG. 8A is a graph showing shear strain vs. Azimuth [Deg] in a tire sidewall developed using a FEA Virtual Sensor Signal.
Figure 8B:
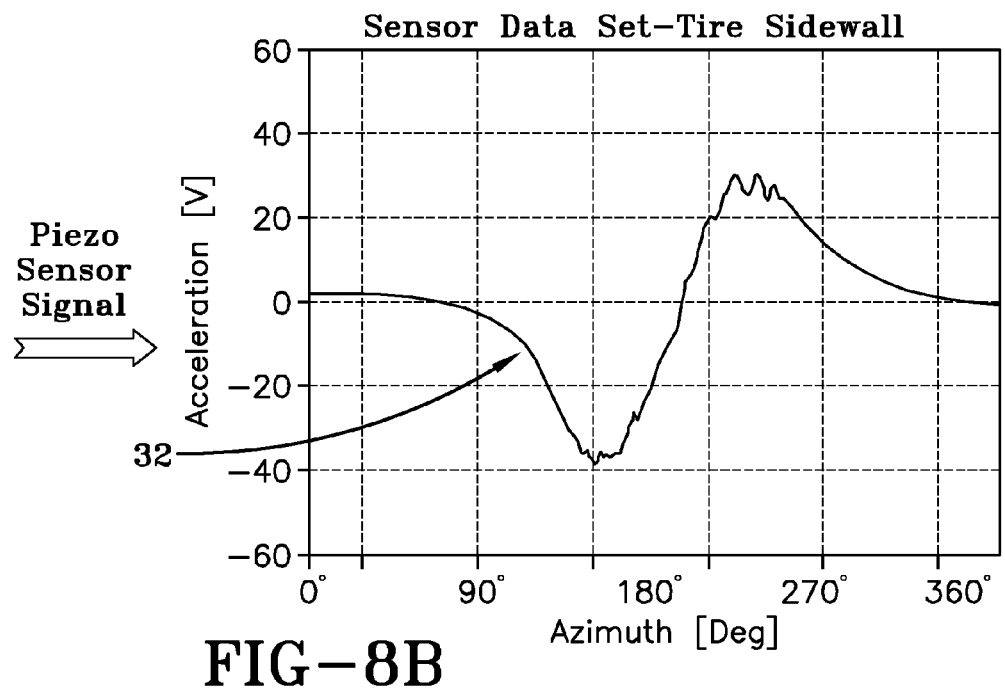
FIG. 8B is a Sensor Data Set graph showing Acceleration {V} vs. Azimuth [Deg] from a Piezosensor Signal.

A finite element analysis (FEA) virtual sensor signal 68 shows the shear strain within the tire sidewall in FIG. 8A and the Piezosensor Signal 32 data set is shown in FIG. 8B as validation of the concept. It will appreciated by the graphs of FIGS. 8A and 8B that the strain data from the tire mounted piezoelectric sensors is indicative of the shear strain within the tire sidewall region.

Figures 9A, 9B:
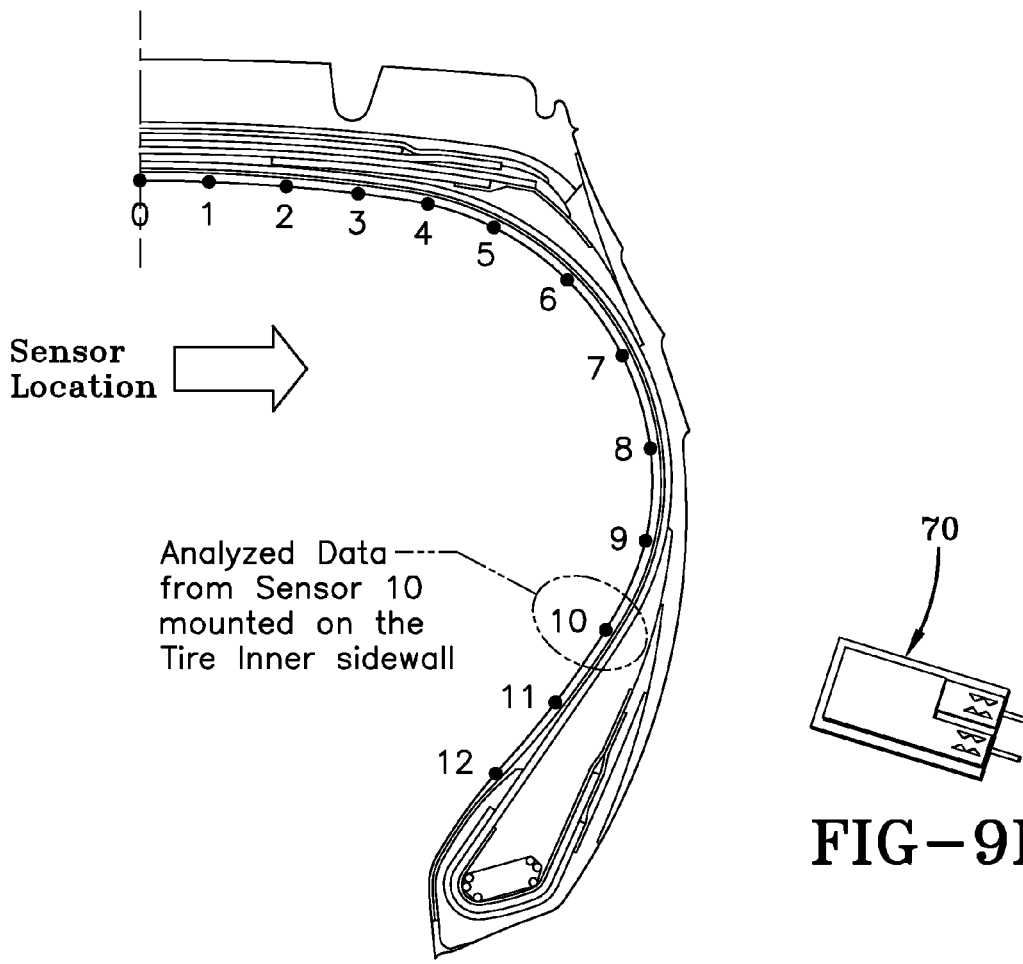
FIG. 9A is a diagrammatic representation of Sensor Location along a tire inner surface and the mounting locations of the enumerated sensors.
FIG. 9B is a schematic representation view of a Piezosensor.
Figure 10A:
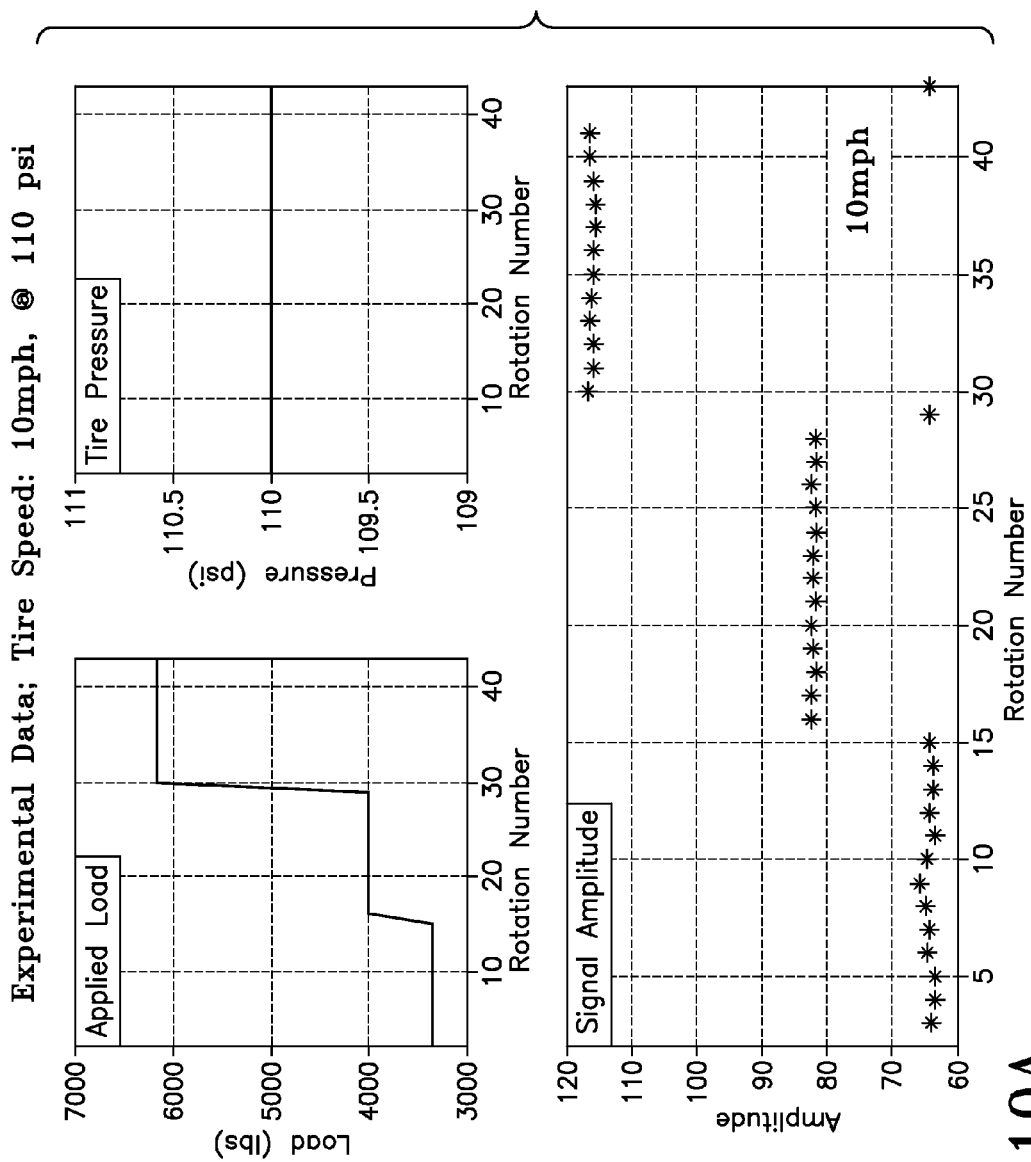
FIG. 10A is graphs of experimental data of applied load, tire pressure, and signal amplitude for tire speed of 10 mph, at 110 psi.
Figure 10B:
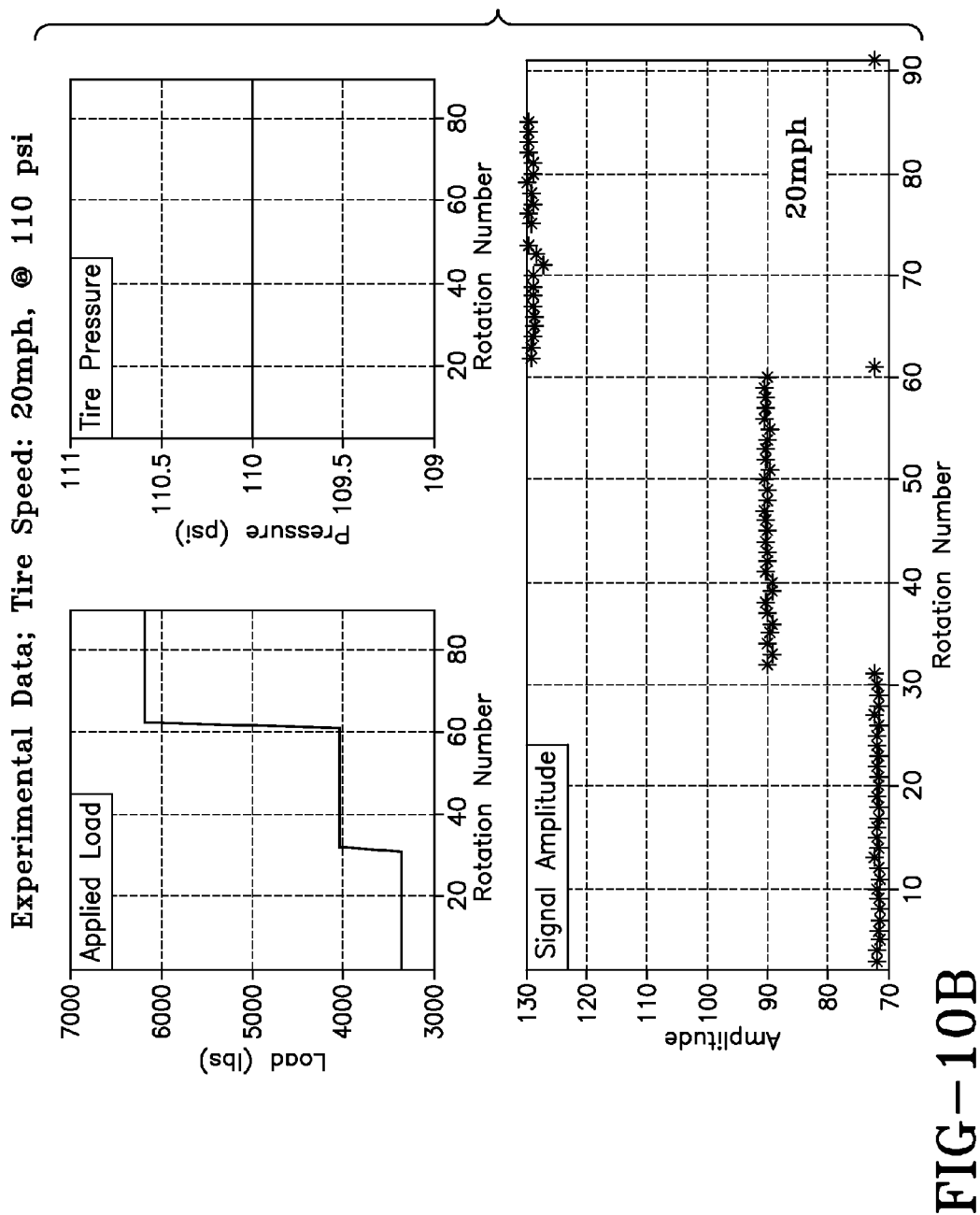
FIG. 10B is graphs of experimental data for tire speed of 20 mph at 110 psi.
Figure 10C:
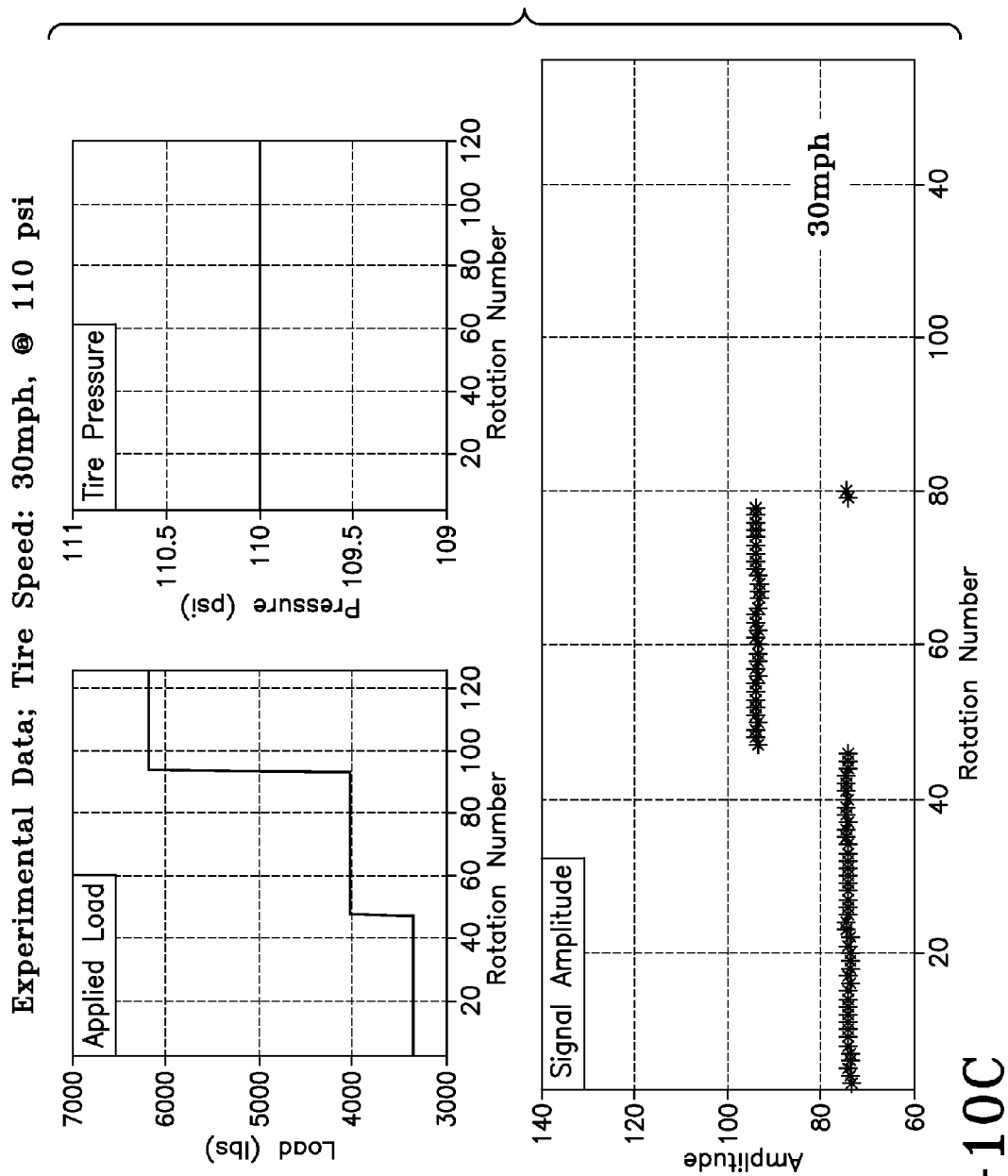
FIG. 10C is graphs of experimental data for tire speed of 30 mph at 110 psi.
Figure 10D:
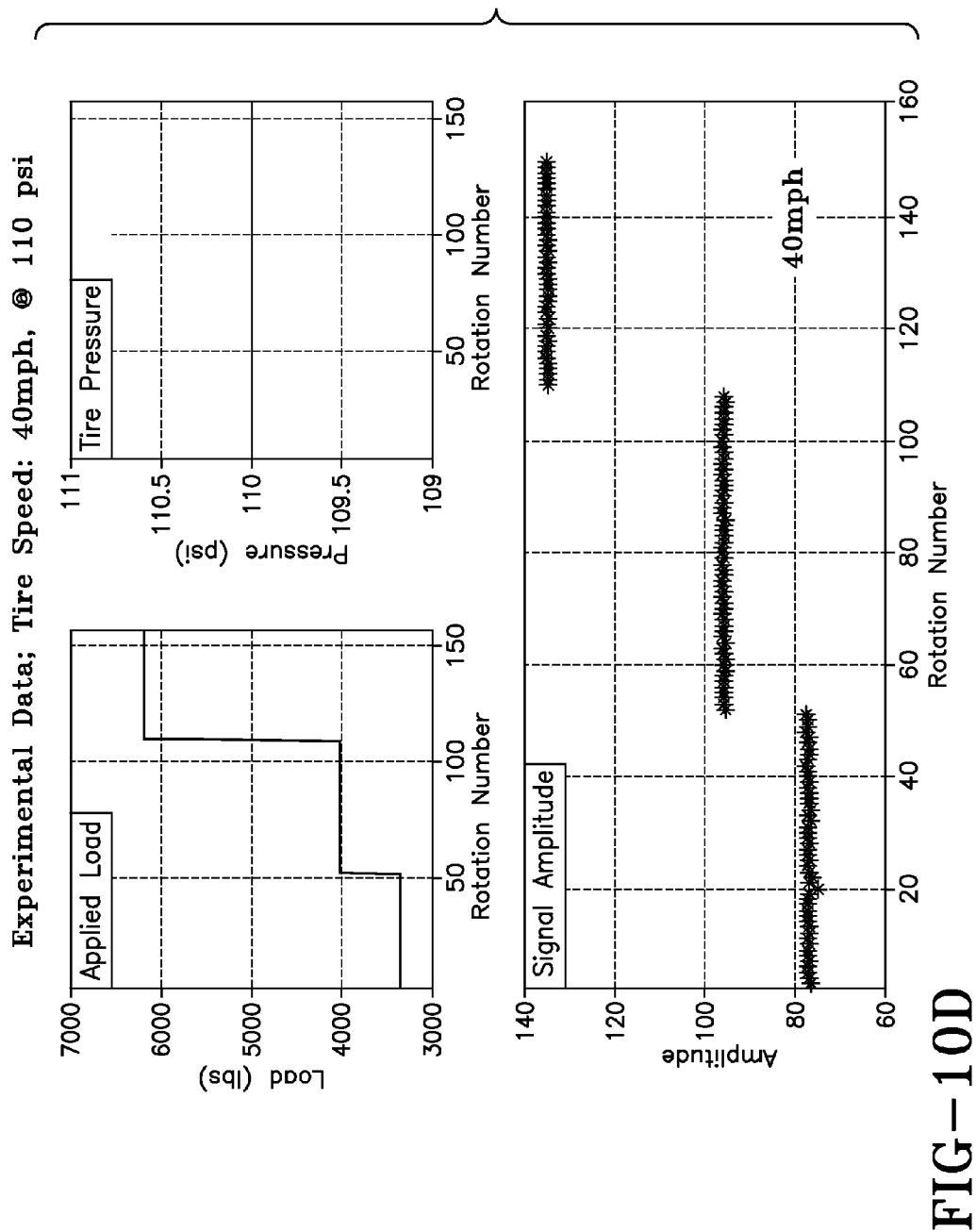
FIG. 10D is graphs of experimental data for tire speed of 40 mph at 110 psi.
Figure 11A:
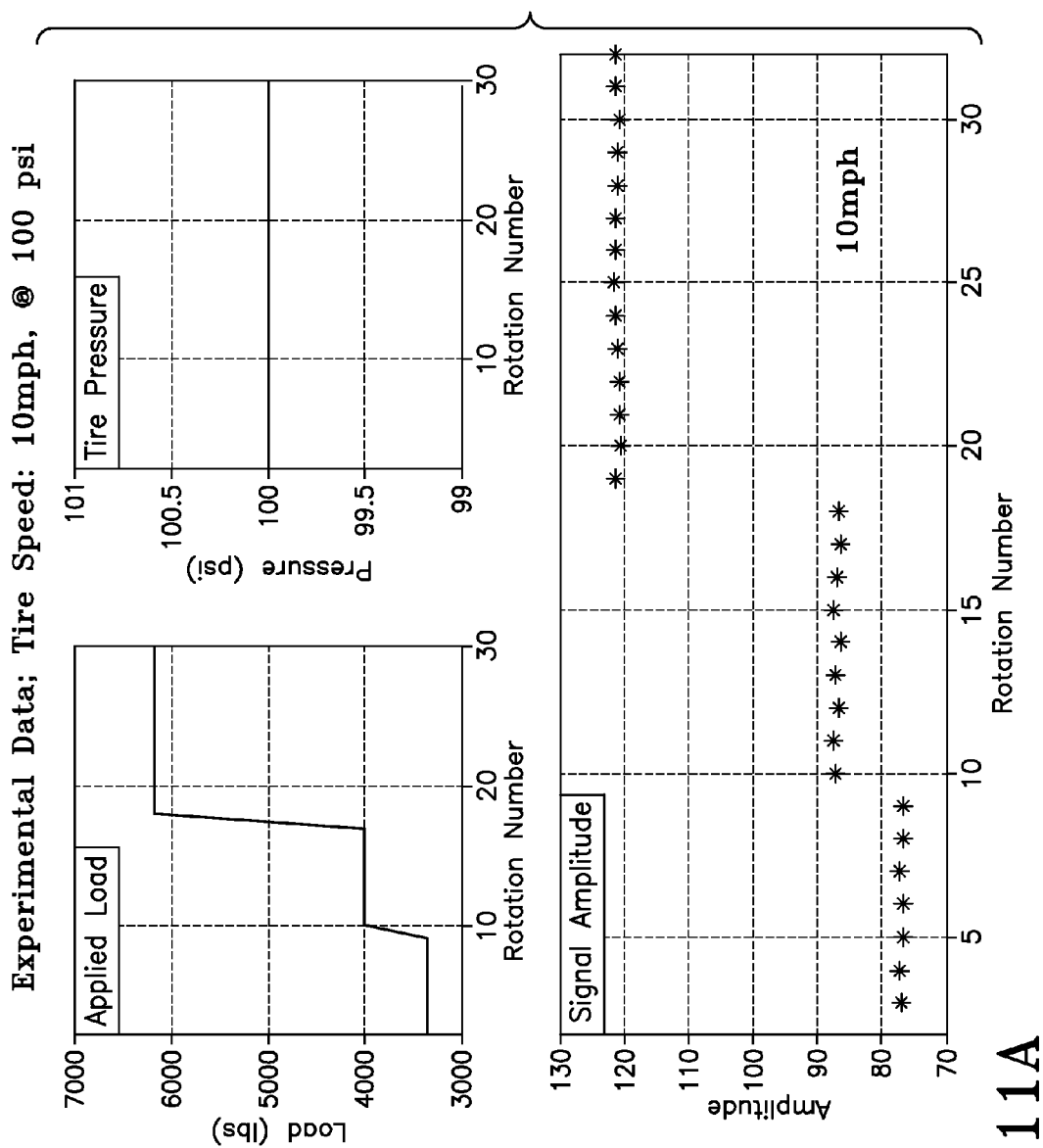
FIG. 11A is graphs of experimental data of applied load, tire pressure, and signal amplitude for tire speed of 10 mph, at 100 psi.
Figure 11B:
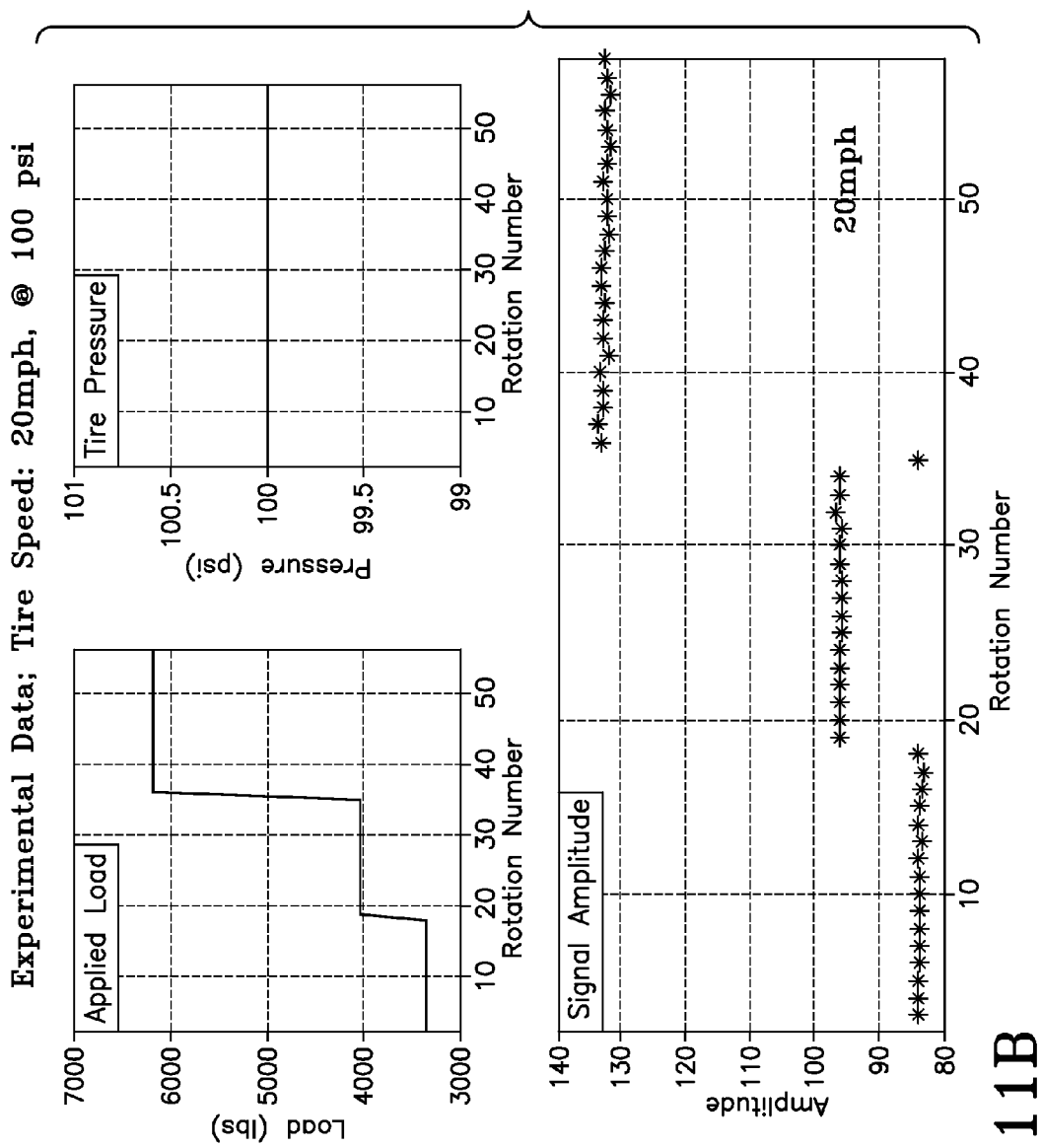
FIG. 11B is graphs of experimental data for tire speed of 20 mph at 100 psi.
Figure 11C:
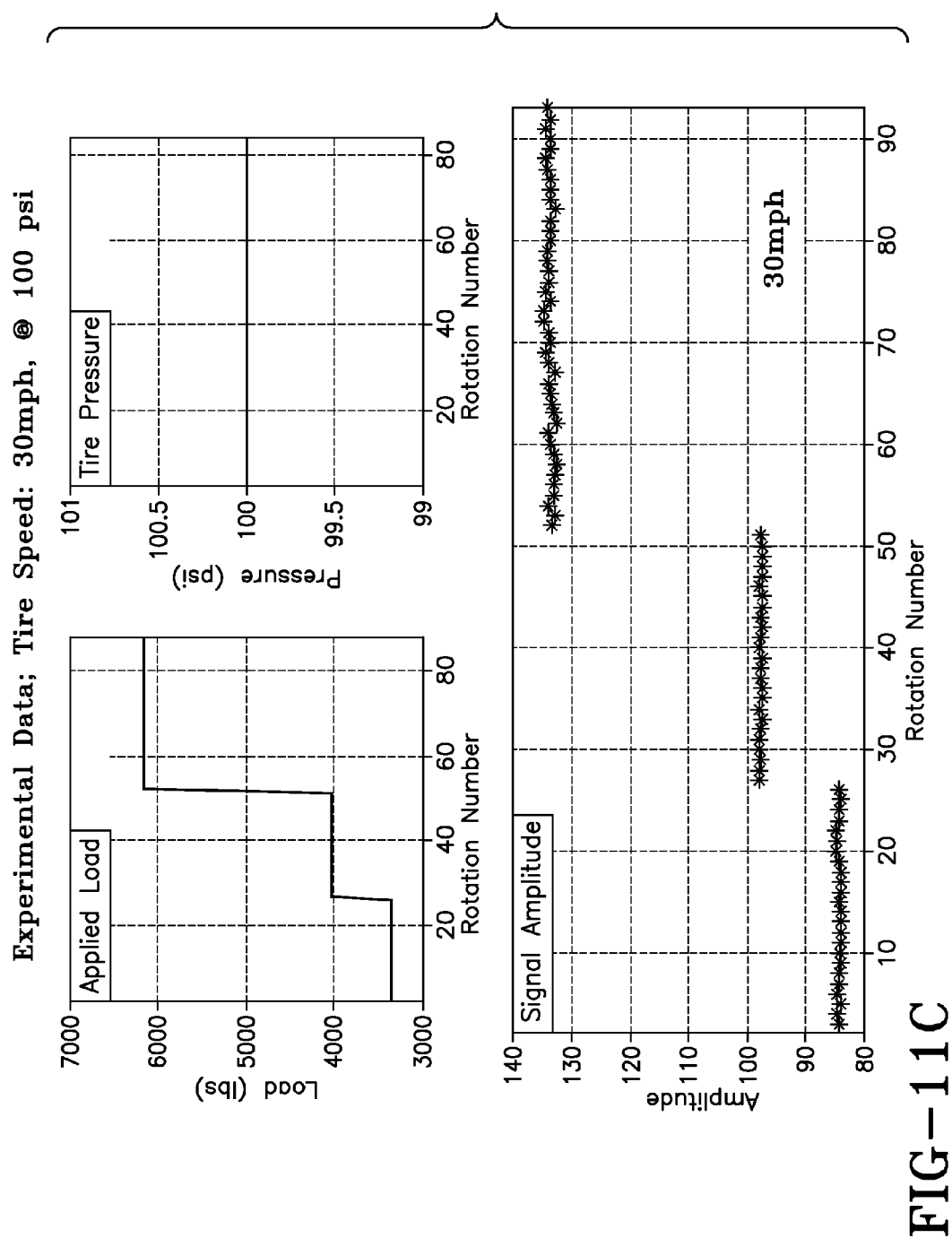
FIG. 11C is graphs of experimental data for tire speed of 30 mph at 100 psi.
Figure 11D:
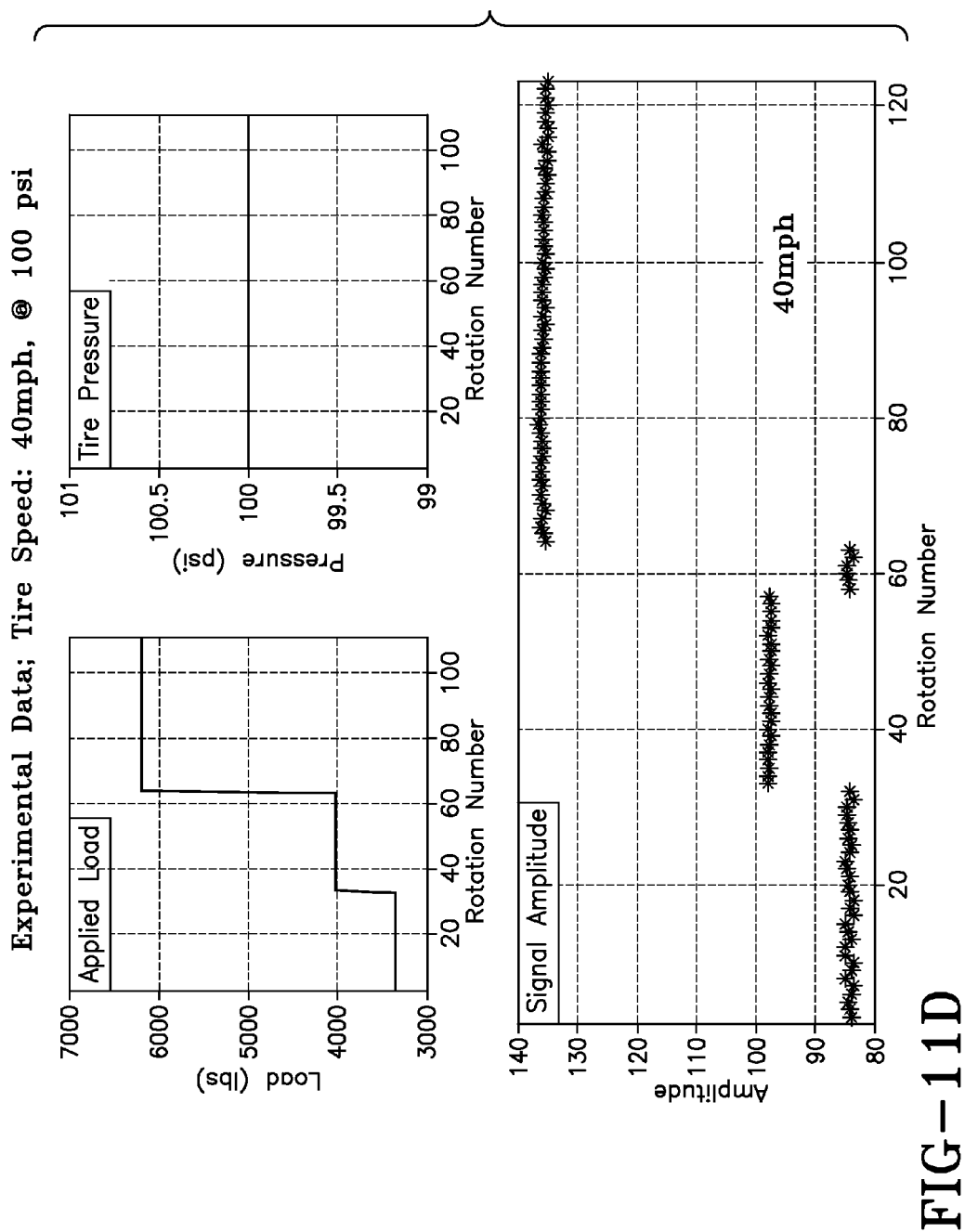
FIG. 11D is graphs of experimental data for tire speed of 40 mph at 100 psi.
Figure 12A:
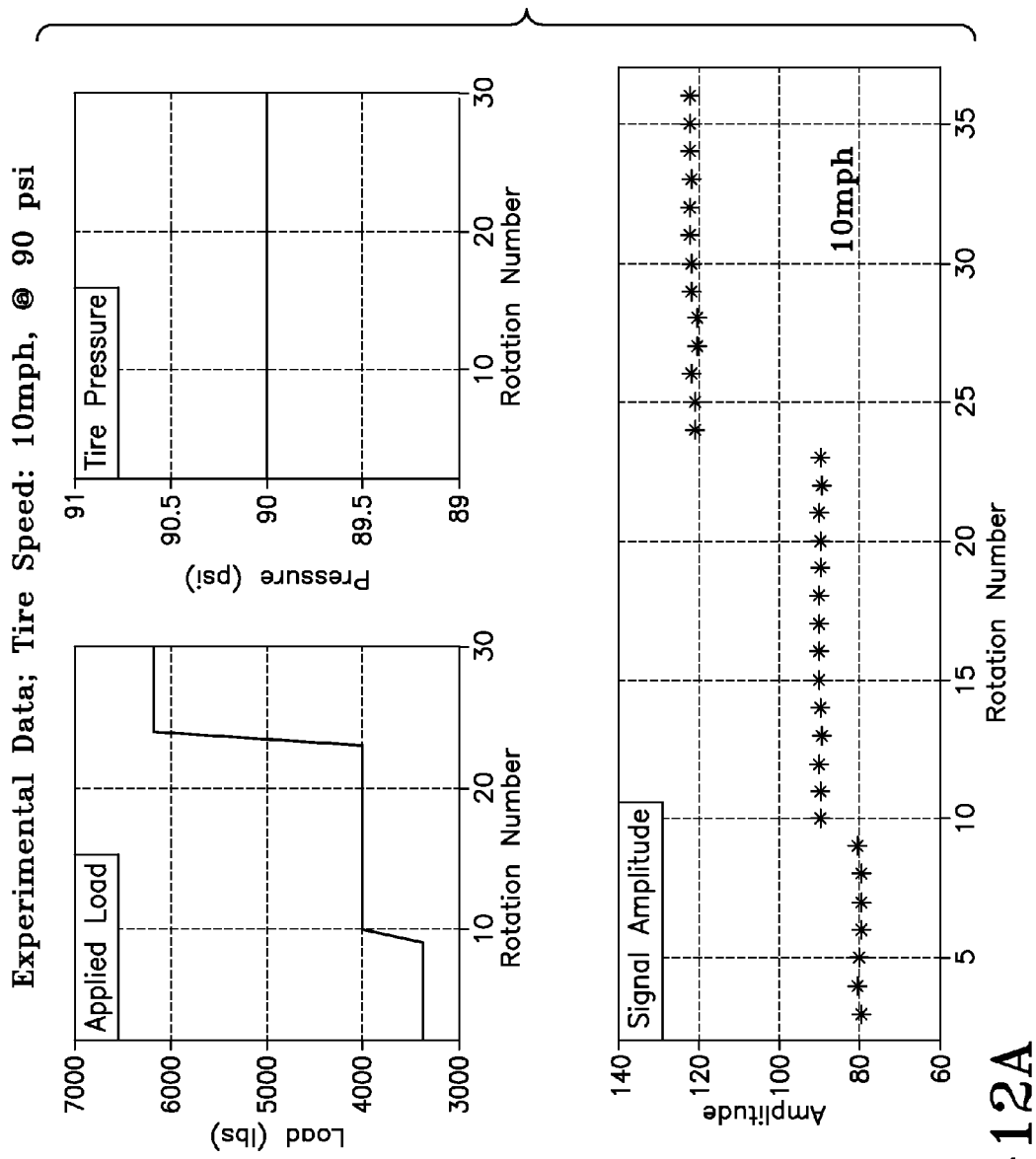
FIG. 12A is graphs of experimental data of applied load, tire pressure, and signal amplitude for tire speed of 10 mph, at 90 psi.
Figure 12B:
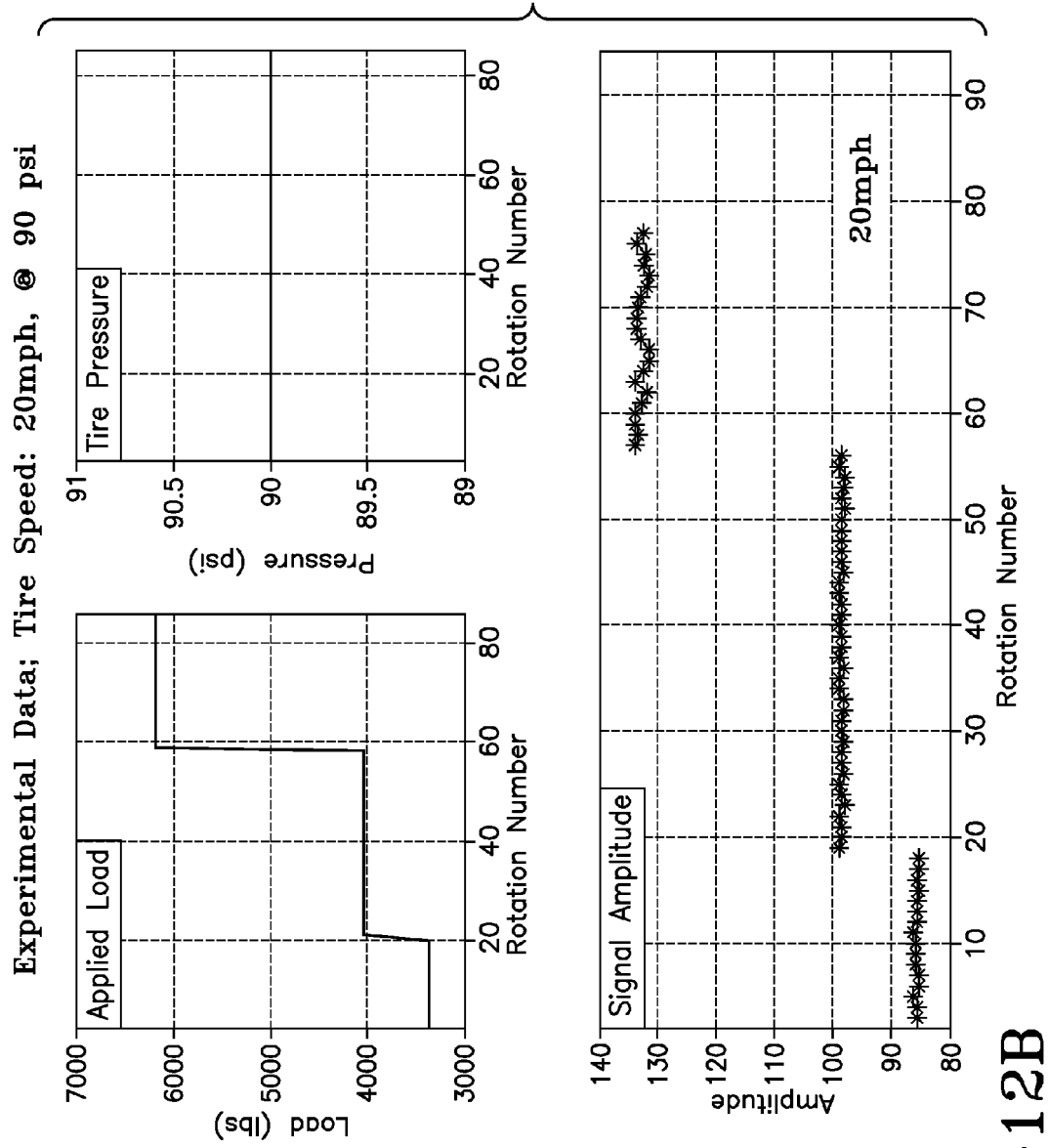
FIG. 12B is graphs of experimental data for tire speed of 20 mph at 90 psi.
Figure 12C:
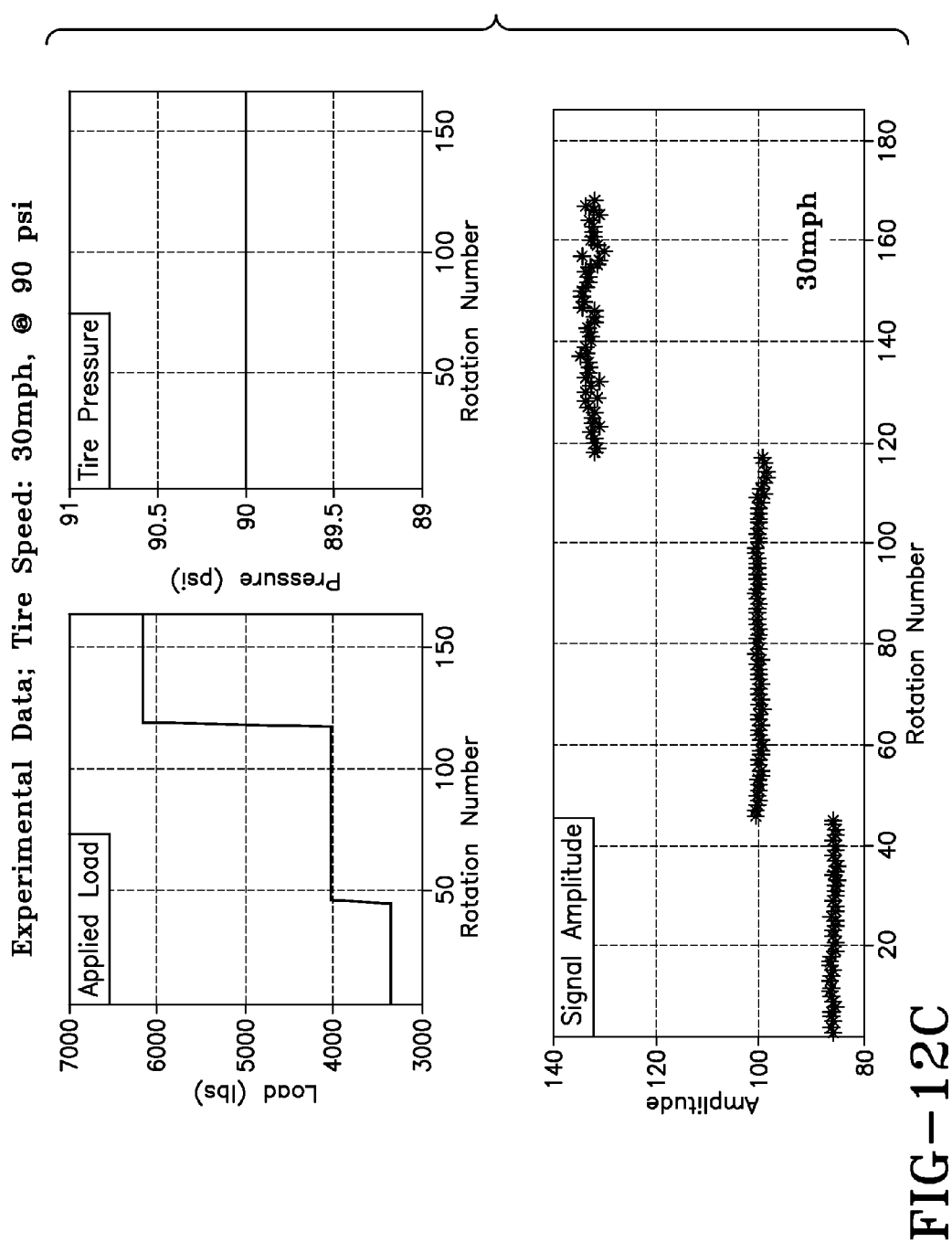
FIG. 12C is graphs of experimental data for tire speed of 30 mph at 90 psi.
Figure 12D:
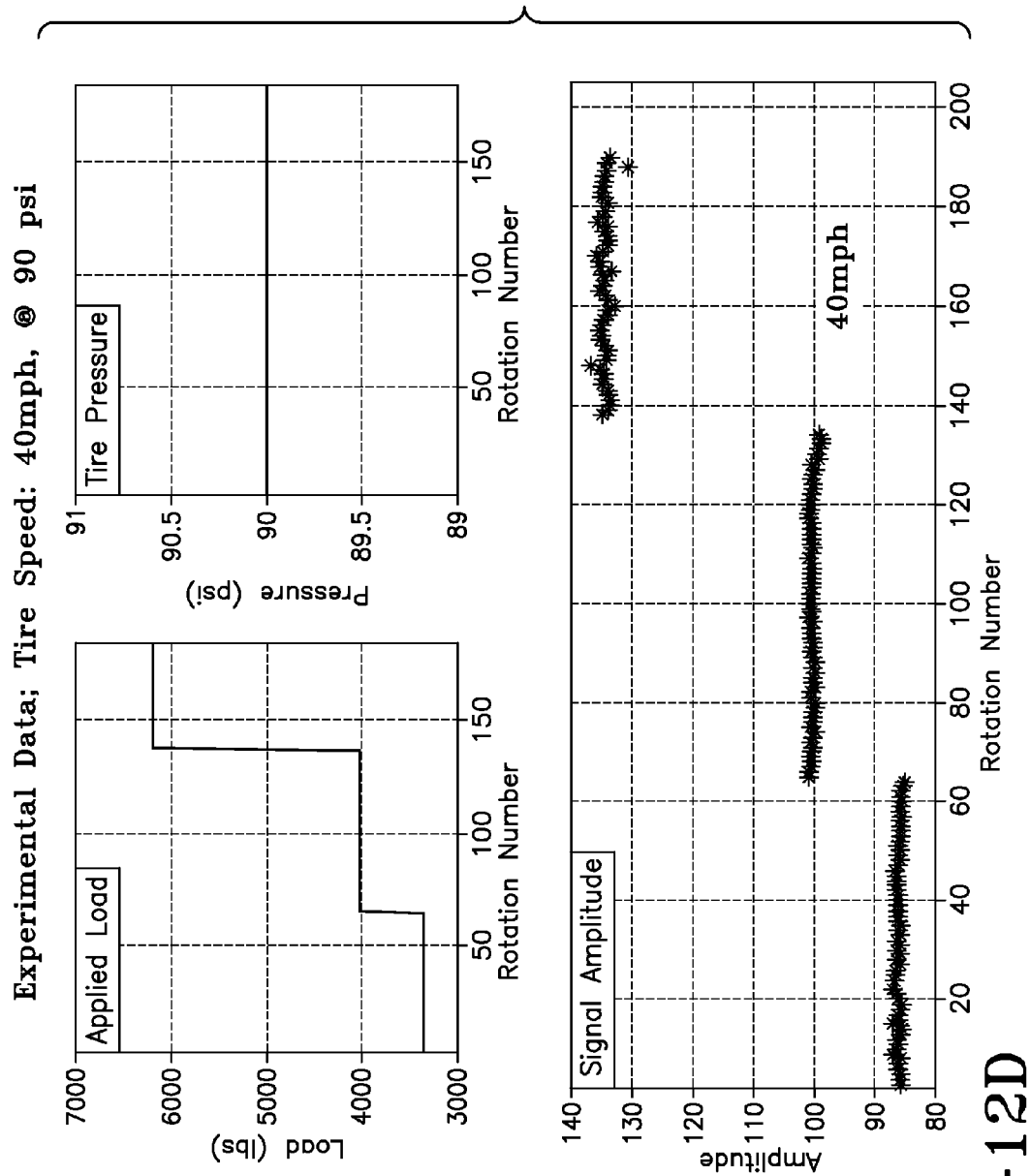
FIG. 12D is graphs of experimental data for tire speed of 40 mph at 90 psi.

FIG. 9A shows the test location of multiple sensors (12 sensors shown for illustration) along a tire sidewall and the enumerated mounting location of each. Sensor 10 results will be analyzed. FIG. 9B shows a representative sensor of a type commercially available, known within the industry as a cantilever piezofilm (Water) sensor. The results of the experimental data at 110 psi and 10 mph are shown in FIG. 10A. For the applied loads, the signal amplitude vs. rotation number may be averaged to derive the constant amplitude under each load condition. In FIG. 10B, the data for 110 psi and 20 mph are given; in FIG. 10C, data for 110 psi and 30 mph; and in FIG. 10D, data for 110 psi and 40 mph. The experimental results indicate that the level of sensor strain amplitude is a constant for each applied load level. Accordingly, the correlation between measured sensor strain amplitude and load level may be stored in a database and, once the measured sensor strain amplitude within a sidewall is known, the load level may be determined therefrom.

FIGS. 11A through D show the experimental test data for tire speeds between 10 and 40 mph at 10 mph gradients, respectively, under tire inflation of 100 psi. It will be noted by comparing the 110 psi against the 100 psi data, that changes in tire inflation pressure will alter the measured sensor signal amplitudes for the applied loads. Consequently, tire pressure must be know in order to interpret the strain sensor amplitude and deduce the applied load on the tire therefrom. The Monitoring System mounted to each tire thus provides the tire pressure measurement necessary to identify the appropriate sensor strain to applied load table stored in the database. FIGS. 12A through D show the experimental test data for tire speeds between 10 and 40 mph at 10 mph gradients, respectively, with a tire inflation of 90 psi. Again, the data verifies that changes in tire inflation pressure in a tire will alter the measured sensor signal amplitudes from that tire for the different applied loads.

Figure 13:
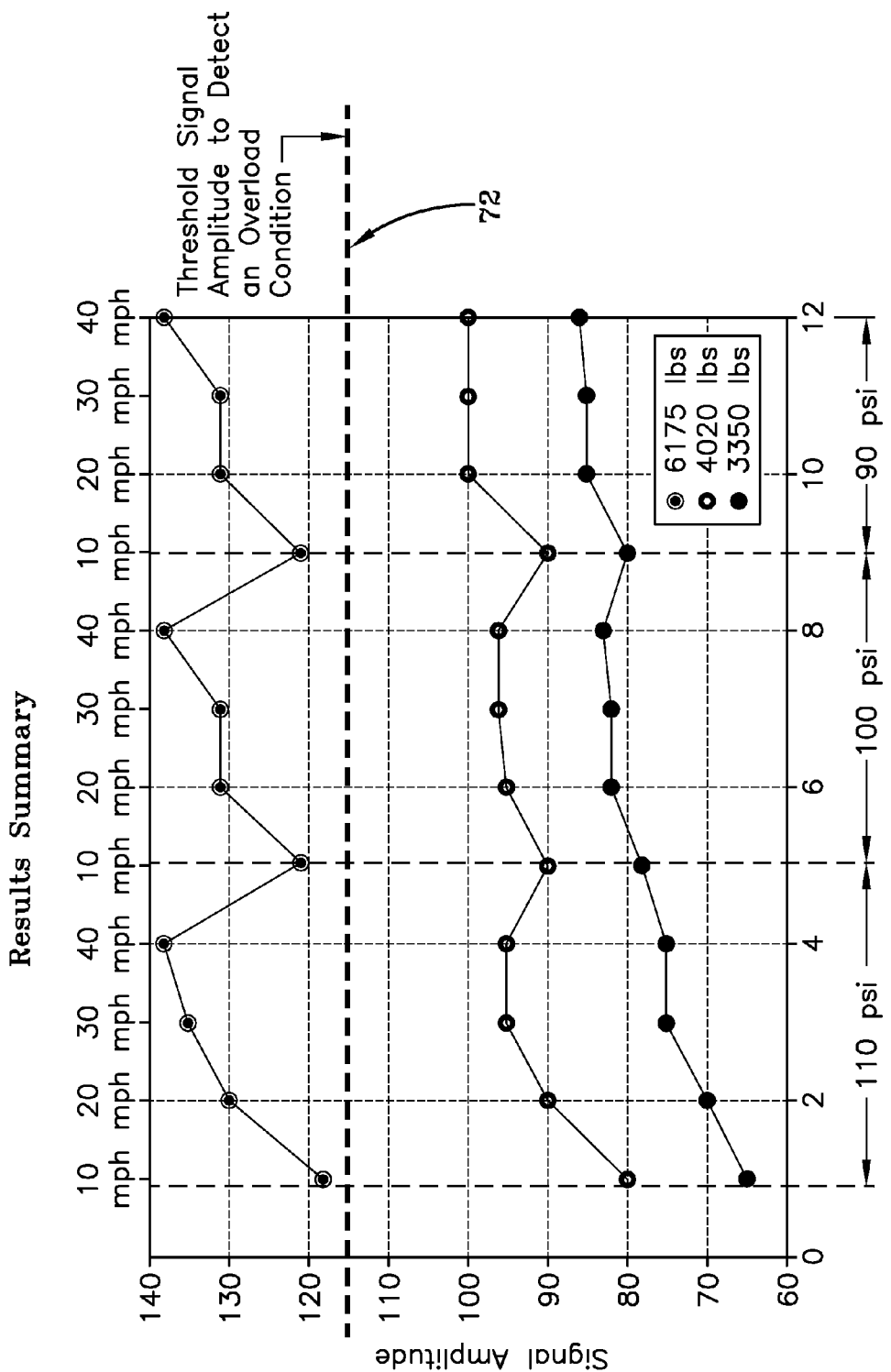
FIG. 13 is a Results Summary graph showing signal amplitude vs. speed for three different loading levels and three different inflation levels.

FIG. 13 sets forth the Results Summary for the different psi settings examined at the three applied load levels. The threshold signal amplitude is identified in broken line 72. The system, as will be understood, can successfully detect an overload condition when the applied load exceeds the preset threshold limit. The overload condition can then prompt a warning to the driver in addition in addition to precisely estimating the dynamic tire load.

As explained previously, FIG. 14 shows the overload warning system in a block level diagram. The threshold data is stored in memory. The tire pressure 52 and the average sensor signal power 54 are continuously monitored and measured in a tire in order to provide data necessary to identify the applicable threshold look-up table in memory to use. The loading on the tire is determined from appropriate memory tables. The tire may further be identified by type and size through a tire RFID identification device attached to the tire. A table is then consulted in memory and used to establish the applicable threshold value for the tire type and size of interest and its inflation level. The actual applied load value is then compared against the threshold load value (step 56) to determine whether an overload condition exists.

FIG. 15 shows the algorithm proposed in a functional block diagram form. A singular strain gauge 20 may be mounted to a tire sidewall, or a pair of sensors 20, 22 mounted to inward and opposite sidewalls of each tire. Alternatively, multiple pairs of sensors may be mounted to each tire in order to analyze the loading on the tire from various tire locations. The sensor signal(s) 32, 33 are averaged to derive an average signal power estimation 40. Average signal power is estimated to account for the variations in the signal during a cornering maneuver. As shown in the test data, the average signal power is a constant even during a cornering maneuver. Signal-Power-Load Maps are stored in memory from empirical studies of the type discussed previously herein. The tire load estimation algorithm takes from Signal Power-Load Maps 42 stored in memory the loading level appropriate for the Signal Power and measured tire pressure detected. The loading level so obtained may then be used to analyze the overload condition. Tire loading data may further be used to analyze load distribution of the vehicle from tire to tire.

Figure 16:
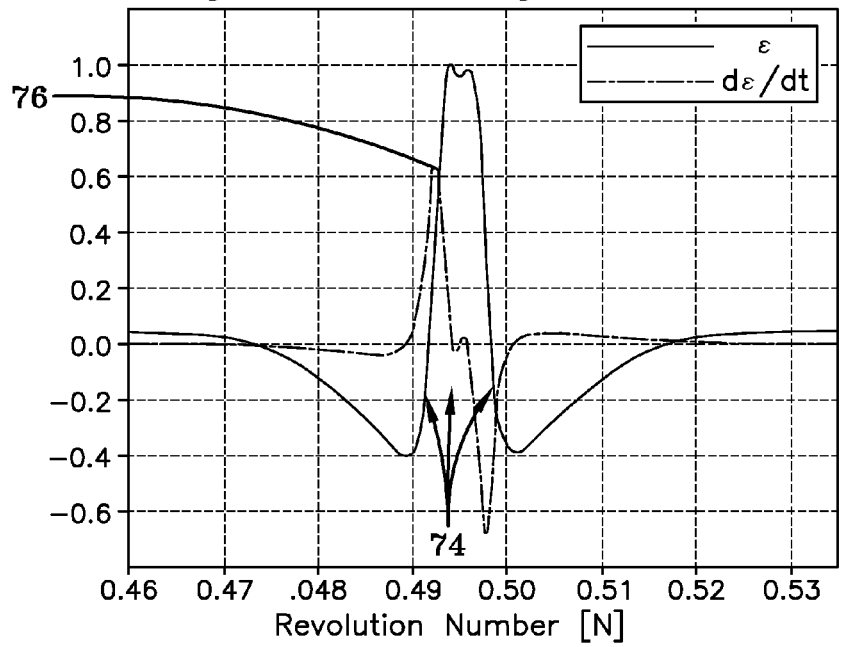
FIG. 16 is a graph demonstrating the process of contact patch length estimation using a derivative waveform.
Figure 16:
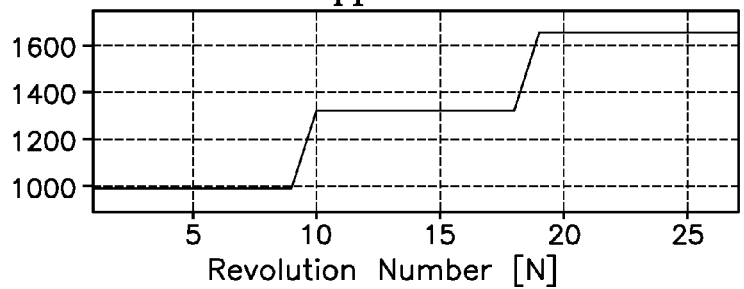
Figure 16:
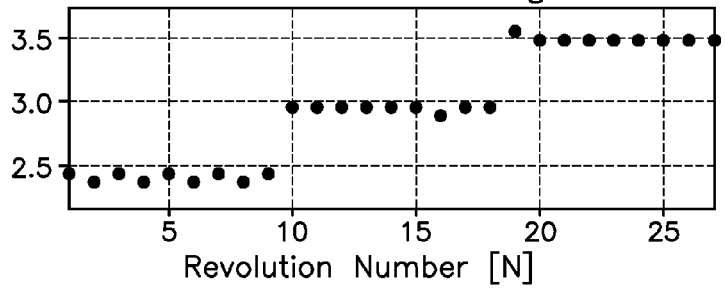

It will be appreciated that the subject proposed algorithm which relies on sidewall deformation measurement has decided advantages over systems which use a tire crown based approach In a crown based approach, the load is characterized using patch length information. FIG. 16 shows patch length estimation using a derivative waveform for three sets of loading levels. The top graph shows the longitudinal strain wave form and its differential waveform. The contact patch length varies as will be noted for each load level so, theoretically, measuring patch length will yield loading information on the tire. In FIG. 16, the patch length or contact patch is indicated at numeral 74, with the leading edge of the patch at 76. Precise patch length estimation, however, can be challenging since sophisticated signal processing techniques are required to precisely find the leading and trailing edge of the signal to estimate the patch length accurately. Moreover, under certain conditions (e.g. during aquaplaning), the tire crown deformation is drastically different from deformation under normal conditions, for the same tire load.

From the foregoing, it will be understood that a system and method of estimating a load bearing on a vehicle tire is provided. The system includes an inflation pressure measuring sensor attached to one or both of the tire for measuring a tire cavity inflation pressure level; and one or more piezofilm deformation measuring sensors mounted to one or both of the tire sidewalls. The deformation measuring sensor(s) generate within the tire footprint a deformation signal having signal power level indicative of a level of sidewall deformation within the footprint contact patch. Power-to-load maps adjusted for tire inflation pressure are generated and stored for the tire, the maps correlating a range of load levels to a range of signal power levels whereby operatively enabling a load level to be identified for each signal power level on an inflation pressure adjusted basis. In the system embodying a plurality of deformation measuring sensors, mounted to both sidewalls, an average of the signal power level from each sensor is used in referencing the power-to-load maps in order to identify a corresponding load level on the tire on an inflation pressure adjusted basis.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of estimating a load on a vehicle tire, comprising:
    (A) attaching at least one deformation measuring sensor to at least one sidewall of the vehicle tire, the deformation measuring sensor generating a cyclical deformation signal having a signal power level indicative of a deformation of the one sidewall in the tire under a rolling condition;
    (B) attaching a tire inflation pressure measuring sensor to the vehicle tire, the inflation pressure measuring sensor measuring tire inflation pressure within a tire cavity and generating detected inflation level data;
    (C) electronically storing power-to-load maps adjusted for tire inflation pressure for the tire, the maps correlating a range of load levels to a range of signal power levels whereby operatively enabling a load level to be identified for each signal power level adjusted for tire inflation pressure;
    (D) measuring a detected signal power level of a deformation signal from the deformation measuring sensor;
    (E) measuring a detected inflation level from the tire cavity by means of the tire inflation pressure measuring sensor;
    (F) extracting from the signal power-to-load maps a tire pressure level-adjusted estimated load level corresponding to a detected signal power level.

2. The method of claim 1, wherein further comprising attaching at least one inner deformation measuring sensor in an axially inwardly located tire sidewall and attaching at least one outer deformation measuring sensor in an axially outwardly located tire sidewall; and measuring a detected inner signal power level from the inner deformation measuring sensor; and measuring a detected outer signal power level from the outer deformation measuring sensor; and averaging the detected inner signal power level with the outer signal power level to create an averaged detected signal power level.

3. The method of claim 2, wherein further comprising using the averaged detected signal power level to extract from the signal power-to-load maps an estimated load level corresponding to the averaged detected signal power level at the detected inflation level.

4. The method of claim 1, wherein further comprising comparing the estimated load level from the signal power-to-load maps to an overload threshold load level; and generating a warning signal in the event that the estimated load level exceeds the overload threshold load level.

5. The method of claim 1, wherein attaching at least one deformation measuring sensor in at least one sidewall of the vehicle tire comprises attaching a cantilever piezofilm strain sensor to the tire one sidewall.

6. A system of estimating a load bearing on a vehicle tire, comprising:
    (A) a vehicle tire having a tire cavity and supporting a load;

(B) an inflation pressure measuring sensor attached to the tire for measuring a tire cavity inflation pressure level;

(C) at least one deformation measuring sensor mounted to at least one of the tire sidewalls, the deformation measuring sensor comprising a piezoelectric sensor rotating with the tire sidewall through a tire footprint, the deformation measuring sensor generating within the tire footprint a deformation signal having signal power level indicative of a level of sidewall deformation within the footprint contact patch;

(D) electronically stored power-to-load maps adjusted for tire inflation pressure for the tire, the maps correlating a range of load levels to a range of signal power levels whereby operatively enabling a load level to be identified for each signal power level adjusted for tire inflation pressure; and (E) electronic means for extracting from the signal power-to-load maps a tire pressure level-adjusted estimated load level corresponding to a detected signal power level.

7. The system of claim 6, wherein the deformation measuring sensor comprises a piezoelectric strain sensor.

8. The system of claim 7, wherein the piezoelectric strain sensor comprises a piezofilm strain sensor.

9. The system of claim 6, wherein further comprising at least one deformation measuring sensor mounted to a first sidewall and at least a second deformation measuring sensor mounted to an opposite second sidewall, the first and the second sidewall deformation measuring sensors each measuring a bending of the respective first and second opposite sidewalls within a rolling tire footprint and generating respectively a first signal having a first detected signal power level and a second signal having a second detected signal power level.

10. The system of claim 9, wherein the means for extracting from the signal power-to-load maps an estimated load level operatively applying an average of the first and the second detected signal power levels to extract the estimated load from the signal power-to-load maps.

11. The system of claim 10, wherein further comprising comparator means operatively comparing the estimated load to an overload threshold load level and generating a warning signal in the event that the estimated load level exceeds the overload threshold load level.

12. A system of estimating a load bearing on a vehicle tire, comprising:

(A) a vehicle tire having a tire cavity and supporting a load;

(B) an inflation pressure measuring sensor attached to the tire for measuring a tire cavity inflation pressure level;

(C) at least a first deformation measuring sensor mounted to a first tire sidewall and at least a second deformation measuring sensor mounted to an opposite second tire sidewall, the first and second deformation measuring sensors comprising a piezoelectric sensor rotating with the tire sidewall through a tire footprint, the first and the second deformation measuring sensors generating within the tire footprint respectively a first deformation signal having first signal power level and a second deformation signal having a second signal power level, the first the second signal power levels each indicative of a level of respective sidewall deformation within the footprint contact patch;

(D) electronically stored tire inflation pressure-adjusted power-to-load maps for the tire, the maps correlating a range of load levels to a range of signal power levels whereby operatively enabling a load level to be identified for each signal power level; and (E) electronic means for extracting from the signal power-to-load maps an estimated load level corresponding to a detected signal power level based upon a combined average of the first and the second signal power levels.

13. The system of claim 12, wherein the system comprising a plurality of spaced apart first deformation measuring sensors mounted to the first sidewall and a plurality of spaced apart second deformation measuring sensors mounted to the second sidewall.

14. The system of claim 13, wherein the electronic means for extracting from the signal power-to-load maps operatively averages a combination of signal power levels from the first and the second plurality of deformation measuring sensors.

* * * * *